US011360308B2

(12) United States Patent
Maimone et al.

(10) Patent No.: US 11,360,308 B2
(45) Date of Patent: Jun. 14, 2022

(54) OPTICAL ASSEMBLY WITH HOLOGRAPHIC OPTICS FOR FOLDED OPTICAL PATH

(71) Applicant: Facebook Technologies, LLC, Menlo Park, CA (US)

(72) Inventors: Andrew Maimone, Duvall, WA (US); Junren Wang, Redmond, WA (US); Barry Silverstein, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 147 days.

(21) Appl. No.: 16/782,604

(22) Filed: Feb. 5, 2020

(65) Prior Publication Data
US 2021/0223548 A1    Jul. 22, 2021

Related U.S. Application Data

(60) Provisional application No. 62/964,564, filed on Jan. 22, 2020.

(51) Int. Cl.
*G02B 27/01* (2006.01)
*G02B 27/28* (2006.01)
(Continued)

(52) U.S. Cl.
CPC ....... *G02B 27/0172* (2013.01); *G02B 5/1842* (2013.01); *G02B 5/32* (2013.01);
(Continued)

(58) Field of Classification Search
CPC .............. G02B 27/0172; G02B 27/017; G02B 27/026; G02B 27/1006; G02B 27/1086;
(Continued)

(56) References Cited

U.S. PATENT DOCUMENTS 6,094,242 A    7/2000 Yamanaka
6,373,603 B1    4/2002 Popovich et al.
(Continued)

FOREIGN PATENT DOCUMENTS

FR    2690534 A1    10/1993
GB    2384059 A    7/2003
WO    2019104046 A1    5/2019

OTHER PUBLICATIONS

Aye et al., "Compact HMD opics based on multiplexed aberration-compensated hologrphic optical elements," Proceedings of SPIE, Event: Aerospace/Defense Sensing, Simulation, and Controls, 2001, Orlando, FL, 10 pgs.
(Continued)

*Primary Examiner* — William R Alexander
(74) *Attorney, Agent, or Firm* — Morgan, Lewis & Bockius LLP

(57) ABSTRACT

An optical device for a head-mounted display device includes a first partial reflector and a second partial reflector positioned relative to the first partial reflector so that the second partial reflector receives first light transmitted through the first partial reflector and reflects at least a portion of the first light toward the first partial reflector as second light. At least a portion of the second light is reflected by the first partial reflector as third light, and at least a portion of the third light is transmitted through the second partial reflector. At least one of the first partial reflector or the second partial reflector includes a reflective holographic element.

20 Claims, 16 Drawing Sheets

(51) Int. Cl.

| | |
|---|---|
| *G02B 27/00* | (2006.01) |
| *G02B 27/14* | (2006.01) |
| *G02B 27/02* | (2006.01) |
| *G02B 27/48* | (2006.01) |
| *G02B 5/18* | (2006.01) |
| *G02B 5/32* | (2006.01) |
| *G02B 17/00* | (2006.01) |
| *G02B 27/10* | (2006.01) |

(52) U.S. Cl.
CPC ....... *G02B 17/004* (2013.01); *G02B 27/0093* (2013.01); *G02B 27/026* (2013.01); *G02B 27/1006* (2013.01); *G02B 27/1086* (2013.01); *G02B 27/14* (2013.01); *G02B 27/285* (2013.01); *G02B 27/48* (2013.01); *G02B 2027/0174* (2013.01); *G02B 2027/0178* (2013.01)

(58) Field of Classification Search
CPC ...... G02B 27/14; G02B 27/285; G02B 27/48; G02B 27/01; G02B 27/0101; G02B 17/004; G02B 5/1842; G02B 5/18; G02B 5/32; G02B 2027/0174; G02B 2027/0178
USPC .......................................................... 359/13
See application file for complete search history.

(56) References Cited

U.S. PATENT DOCUMENTS

| | | | | |
|---|---|---|---|---|
| 7,573,640 | B2* | 8/2009 | Nivon | G02B 27/4216 |
| | | | | 359/630 |
| 7,946,708 | B2* | 5/2011 | Sakata | G02B 27/01 |
| | | | | 353/13 |
| 8,570,656 | B1 | 10/2013 | Weissman | |
| 8,698,713 | B2 | 4/2014 | Hajjar et al. | |
| 8,941,559 | B2 | 1/2015 | Bar-Zeev et al. | |
| 8,964,298 | B2 | 2/2015 | Haddick et al. | |
| 9,251,745 | B2 | 2/2016 | Sprague | |
| 10,495,798 | B1 | 12/2019 | Peng et al. | |
| 10,634,907 | B1 | 4/2020 | Geng et al. | |
| 11,067,810 | B2* | 7/2021 | Yonekubo | G02B 27/0081 |
| 2004/0108971 | A1 | 6/2004 | Waldern et al. | |
| 2004/0109208 | A1 | 6/2004 | Amanai et al. | |
| 2006/0221448 | A1* | 10/2006 | Nivon | G02B 27/102 |
| | | | | 359/572 |
| 2010/0053121 | A1 | 3/2010 | Sprague | |
| 2011/0096100 | A1 | 4/2011 | Sprague | |
| 2013/0101253 | A1 | 4/2013 | Popovich et al. | |
| 2013/0314793 | A1 | 11/2013 | Robbins et al. | |
| 2014/0168034 | A1 | 6/2014 | Luebke et al. | |
| 2014/0268879 | A1 | 9/2014 | Mizuyama et al. | |
| 2015/0235460 | A1 | 8/2015 | Schowengerdt et al. | |
| 2015/0378074 | A1 | 12/2015 | Kollin et al. | |
| 2016/0026253 | A1 | 1/2016 | Bradski et al. | |
| 2016/0363777 | A1 | 12/2016 | Flynn et al. | |
| 2017/0016594 | A1 | 1/2017 | Di Trapani et al. | |
| 2017/0068102 | A1* | 3/2017 | Wong | G02B 5/30 |
| 2017/0153454 | A1* | 6/2017 | Callier | G02B 27/0172 |
| 2017/0255015 | A1 | 9/2017 | Geng et al. | |
| 2017/0285347 | A1 | 10/2017 | Cai et al. | |
| 2017/0293148 | A1 | 10/2017 | Park et al. | |
| 2017/0336552 | A1 | 11/2017 | Masuda et al. | |
| 2018/0029319 | A1 | 2/2018 | Kalima et al. | |
| 2018/0107007 | A1 | 4/2018 | Wyrwas et al. | |
| 2018/0172988 | A1 | 6/2018 | Ahmed et al. | |
| 2018/0180788 | A1* | 6/2018 | Ambur | G02B 17/0856 |
| 2018/0239147 | A1 | 8/2018 | Schowengerdt et al. | |
| 2018/0267222 | A1* | 9/2018 | Ambur | G02B 5/3066 |
| 2019/0018480 | A1* | 1/2019 | Aleem | G02B 27/017 |
| 2019/0018481 | A1* | 1/2019 | Aleem | G06F 3/147 |
| 2019/0041642 | A1 | 2/2019 | Haddick et al. | |
| 2019/0060602 | A1 | 2/2019 | Tran et al. | |
| 2019/0072767 | A1 | 3/2019 | Vallius et al. | |
| 2019/0094549 | A1* | 3/2019 | Nicholson | G02B 27/0172 |
| 2019/0235235 | A1* | 8/2019 | Ouderkirk | G02B 27/0068 |
| 2019/0265477 | A1 | 8/2019 | Perreault et al. | |
| 2019/0353906 | A1 | 11/2019 | Gollier et al. | |
| 2019/0369403 | A1 | 12/2019 | Leister | |
| 2020/0096816 | A1 | 3/2020 | Lee et al. | |
| 2020/0124858 | A1* | 4/2020 | Cakmakci | G02B 17/08 |
| 2020/0133005 | A1* | 4/2020 | Yonekubo | G02B 27/0172 |
| 2020/0133017 | A1* | 4/2020 | Ide | G02B 27/4211 |
| 2020/0249480 | A1* | 8/2020 | Martinez | G02B 27/0172 |
| 2020/0348530 | A1 | 11/2020 | Xiao et al. | |
| 2020/0379226 | A1* | 12/2020 | Steiner | G02B 27/283 |
| 2021/0080726 | A1 | 3/2021 | Geng et al. | |
| 2021/0271082 | A1* | 9/2021 | Smith | G02B 5/3033 |
| 2021/0278679 | A1* | 9/2021 | Ouderkirk | G02B 27/0955 |
| 2021/0286183 | A1* | 9/2021 | Ouderkirk | G02B 17/0804 |
| 2021/0294012 | A1* | 9/2021 | Wong | G02B 27/283 |

OTHER PUBLICATIONS

Larussa et al., "The Holographic Pancake Window," Proceedings of SPIE 1978, Event: 22nd Annual Technical Symposium, 1978, San Diego, 11 pgs.

Margarines et al., "Wide Angle, Color, Hologrpahic Infinity Optics Display—Final Report," Farrand Optical Co., Valhalla, NY, Rort No. AFHRL-TR-80-53, Mar. 1981, downloaded from https://files.eric.ed.gov/fulltext/ED202467.pdf, 93 pgs.

Ex Parte Quayle Office action dated Dec. 1, 2020 for U.S. Appl. No. 16/810,417, filed Mar. 5, 2020, 9 pages.

International Search Report and Written Opinion for International Application No. PCT/US2020/050776, dated Mar. 15, 2021, 23 Pages.

International Search Report and Written Opinion for International Application No. PCT/US2020/050782, dated Mar. 9, 2021, 16 Pages.

International Search Report and Written Opinion for International Application No. PCT/US2021/013968, dated Jun. 30, 2021, 13 pages.

Invitation to Pay Additional Fees for International Application No. PCT/US2021/013968, dated May 7, 2021, 9 pages.

Moon S., et al., "Layered Display with Accommodation Cue Using Scattering Polarizers," IEEE Journal of Selected Topics in Signal Processing, IEEE, US, Oct. 23, 2017, vol. 11 (7), pp. 1223-1231.

Non-Final Office Action dated Oct. 26, 2020 for U.S. Appl. No. 16/810,445, filed Mar. 5, 2020, 11 pages.

Notice of Allowance dated Jan. 12, 2021 for U.S. Appl. No. 16/810,417, filed Mar. 5, 2020, 6 pages.

Notice of Allowance dated Jan. 27, 2021 for U.S. Appl. No. 16/810,445, filed Mar. 5, 2020, 9 pages.

Non-Final Office Action dated Sep. 3, 2021 for U.S. Appl. No. 16/810,471, filed Mar. 5, 2020, 21 pages.

Notice of Allowance dated Mar. 19, 2021 for U.S. Appl. No. 16/810,485, filed Mar. 5, 2020, 12 pages.

Final Office Action dated Apr. 21, 2022 for U.S. Appl. No. 16/810,471, filed Mar. 5, 2020, 24 pages.

International Preliminary Report on Patentability for International Application No. PCT/US2020/050776, dated Mar. 31, 2022, 18 pages.

International Preliminary Report on Patentability for International Application No. PCT/US2020/050782, dated Mar. 31, 2022, 12 pages.

Notice of Allowance dated Feb. 8, 2022 for U.S. Appl. No. 16/784,718, filed Feb. 7, 2020, 9 pages.

Notice of Allowance dated Apr. 15, 2022 for U.S. Appl. No. 16/810,431, filed Mar. 5, 2020, 10 pages.

Notice of Allowance dated Apr. 26, 2022 for U.S. Appl. No. 16/810,431, filed Mar. 5, 2020, 04 pages.

Notice of Allowance dated Feb. 28, 2022 for U.S. Appl. No. 16/810,494, filed Mar. 5, 2020, 5 pages.

Notice of Allowance dated Mar. 29, 2022 for U.S. Appl. No. 16/810,494, filed Mar. 5, 2020, 5 pages.

Final Office Action dated Nov. 15, 2021 for U.S. Appl. No. 16/810,431, filed Mar. 5, 2020, 14 pages.

(56) References Cited

OTHER PUBLICATIONS

Final Office Action dated Oct. 25, 2021 for U.S. Appl. No. 16/810,494, filed Mar. 5, 2020, 11 pages.
Non-Final Office Action dated Oct. 7, 2021 for U.S. Appl. No. 16/784,718, filed Feb. 7, 2020, 14 Pages.
Non-Final Office Action dated Apr. 27, 2021 for U.S. Appl. No. 16/810,494, filed Mar. 5, 2020, 11 Pages.
Non-Final Office Action dated Jul. 29, 2021 for U.S. Appl. No. 16/810,431, filed Mar. 5, 2020, 12 Pages.
Office Action dated Feb. 2, 2022 for U.S. Appl. No. 17/241,921, filed Apr. 27, 2021, 7 pages.
Final Office Action dated Feb. 4, 2022 for U.S. Appl. No. 16/810,458, filed Mar. 5, 2020, 20 pages.

\* cited by examiner

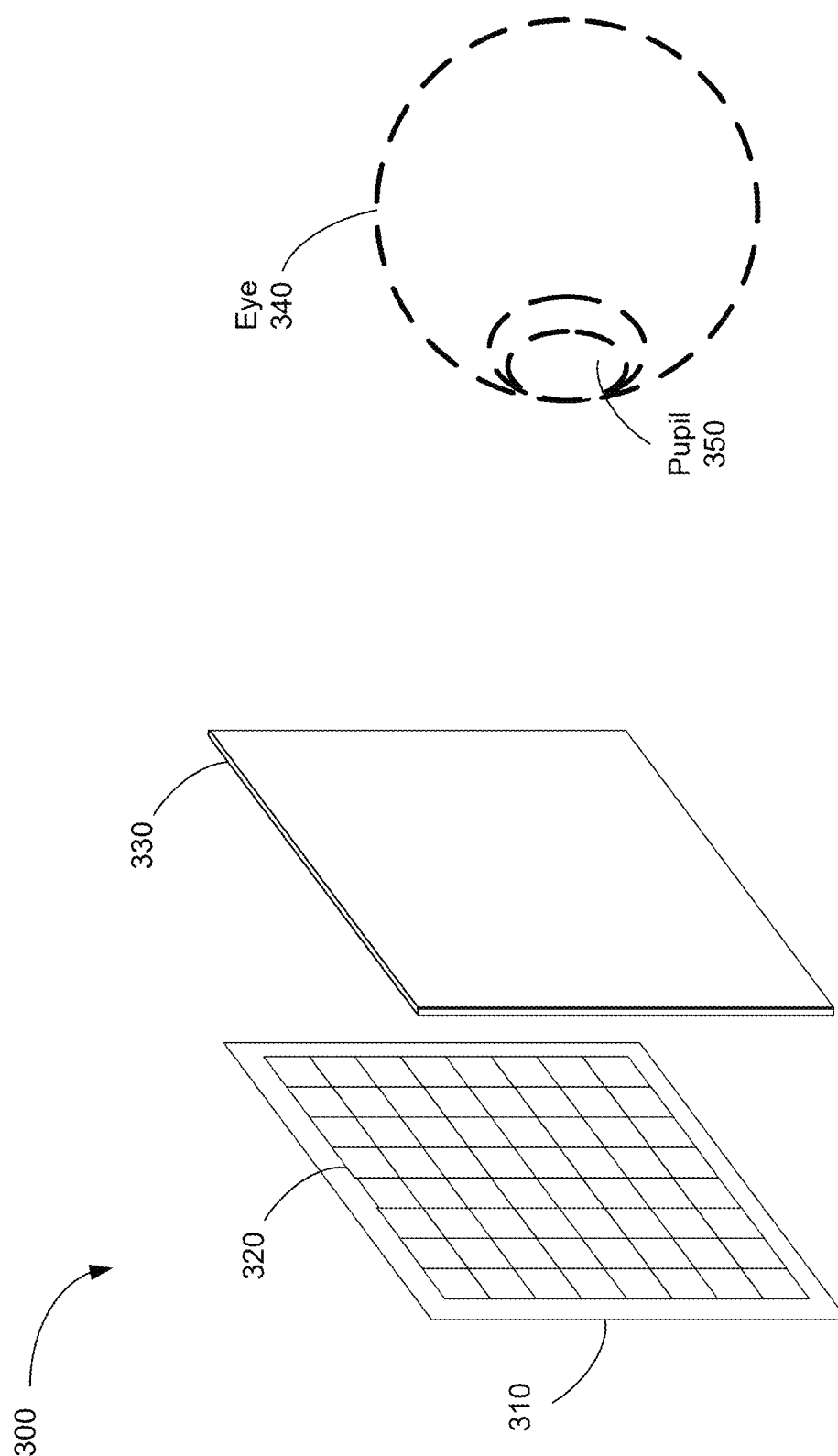

OPTICAL ASSEMBLY WITH HOLOGRAPHIC OPTICS FOR FOLDED OPTICAL PATH

RELATED APPLICATIONS

This application claims the benefit of, and priority to, U.S. Provisional Patent Application Ser. No. 62/964,564, filed on Jan. 22, 2020, which is incorporated by reference herein in its entirety.

TECHNICAL FIELD

This relates generally to head-mounted display devices, and more specifically to optical components used in head-mounted display devices.

BACKGROUND

Head-mounted display devices (also called herein head-mounted displays) are gaining popularity as a means for providing visual information to users.

However, the size and weight of conventional head-mounted display devices have limited application of head-mounted display devices.

SUMMARY

Accordingly, there is a need for head-mounted display devices that are thin and lightweight. Compact head-mounted display devices would also improve user satisfaction with such devices.

The deficiencies and other problems discussed in the background are reduced or eliminated by the disclosed devices, systems, and methods.

In accordance with some embodiments, a head-mounted display device includes diffractive and/or holographic optics, which enable folded optical paths that result in more compact and lighter display devices.

In accordance with some embodiments, an optical device for a head-mounted display device includes a first partial reflector; and a second partial reflector positioned relative to the first partial reflector so that the second partial reflector receives first light transmitted through the first partial reflector and partially reflects a portion of the first light toward the first partial reflector as second light. A portion of the second light is reflected by the first partial reflector as third light, and a portion of the third light is transmitted through the second partial reflector. At least one of the first partial reflector or the second partial reflector comprises a reflective holographic element. In accordance with some embodiments, the optical device is included in an optical system with a display device (e.g., a display panel).

Thus, the disclosed embodiments provide devices and methods that provide an enhanced form factor and optical performance in a compact head-mounted display device configuration.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

Figure 1:
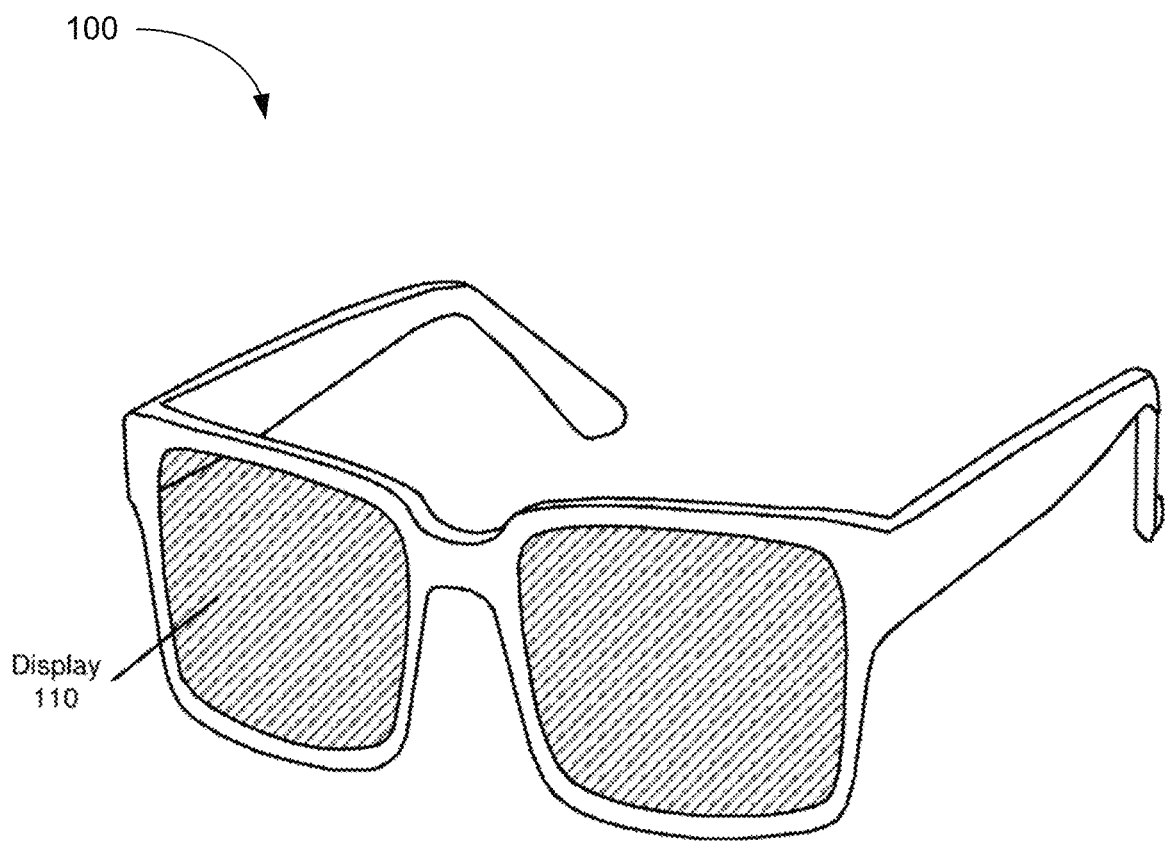
FIG. 1 is a perspective view of a display device in accordance with some embodiments.

These figures are not drawn to scale unless indicated otherwise.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first region could be termed a second region, and, similarly, a second region could be termed a first region, without departing from the scope of the various described embodiments. The first region and the second region are both regions, but they are not the same region.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Embodiments described herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 illustrates display device 100 in accordance with some embodiments. In some embodiments, display device 100 is configured to be worn on the head of a user (e.g., by having the form of spectacles or eyeglasses, as shown in FIG. 1) or to be included as part of a helmet that is to be worn by the user. When display device 100 is configured to be worn on a head of a user or to be included as part of a helmet or headset, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual content (e.g., augmented reality content, virtual reality content, mixed reality content, or any combination thereof) to a user.

In some embodiments, display device 100 includes one or more components described below with respect to FIG. 2. In some embodiments, display device 100 includes additional components not shown in FIG. 2.

Figure 2:
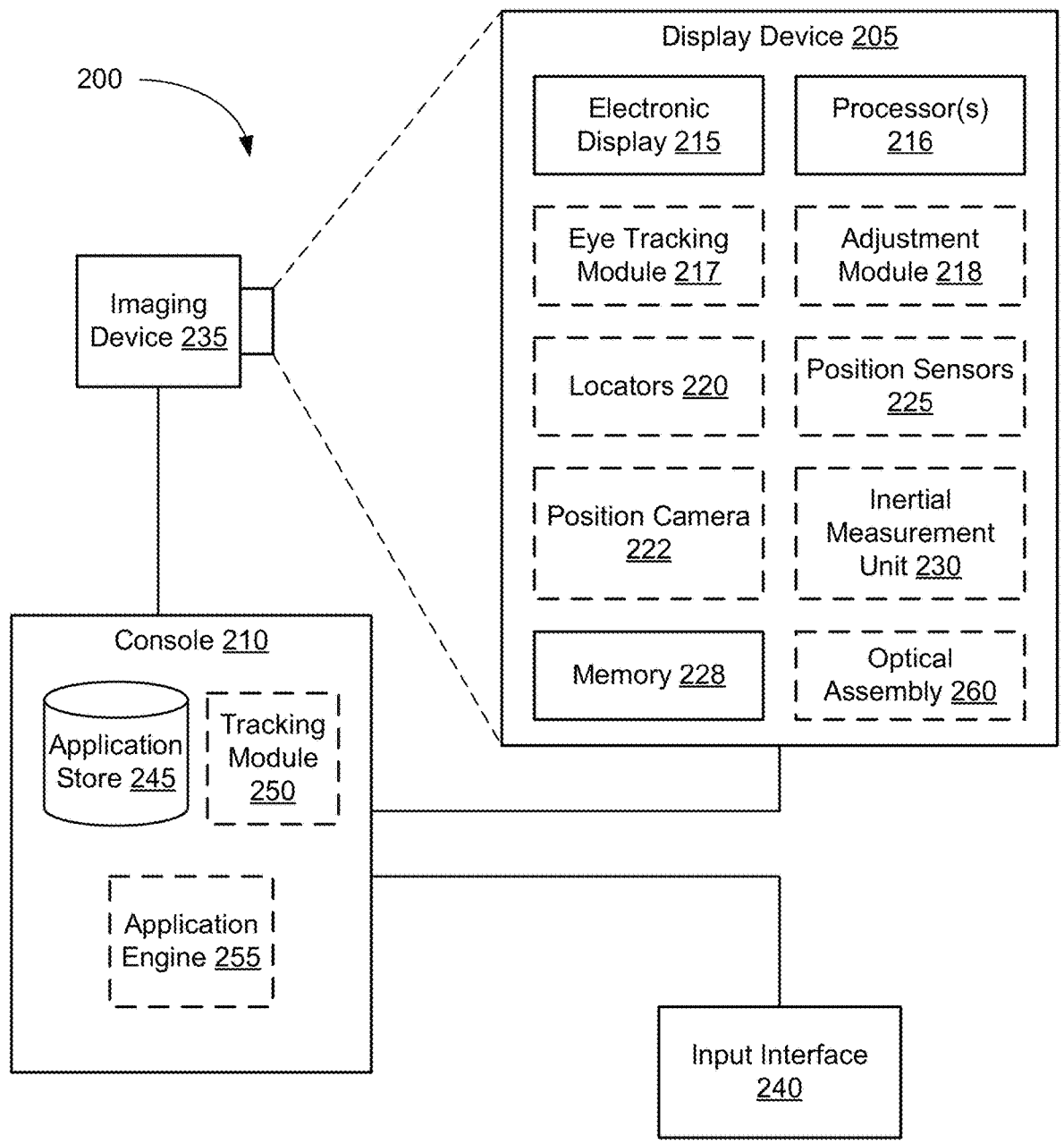
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having an associated input interface 240 and being monitored by one or more imaging devices 235, with each display device 205, input interface 240, and imaging device 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and/or augmented reality.

In some embodiments, as shown in FIG. 1, display device 205 is a head-mounted display that presents media to a user. Examples of media presented by display device 205 include one or more images, video, audio, haptics, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 can augment views of a physical, real-world environment with computer-generated elements (e.g., images, video, sound, haptics, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximate to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display such that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is optionally configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., digital microscope, etc.). In some embodiments, display device 300 includes light emission device array 310 and one or more lenses 330. In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR). In some embodiments, a microLED includes an LED with an emission area characterized by a representative dimension (e.g., a diameter, a width, a height, etc.) of 100 μm or less (e.g., 50 μm, 20 μm, etc.). In some embodiments, a microLED has an emission area having a shape of a circle or a rectangle.

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses 330. In some embodiments, display device 300 uses the emission intensity array to facilitate providing image light to a location of pupil 350 of eye 340 of a user, and minimize the amount of image light provided to other areas in the eyebox.

One or more lenses 330 receive the modified image light (e.g., attenuated light) from the emission intensity array (or directly from emission device array 310), and shifted by one or more beam shifters 360, and direct the shifted image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

Figure 4A:
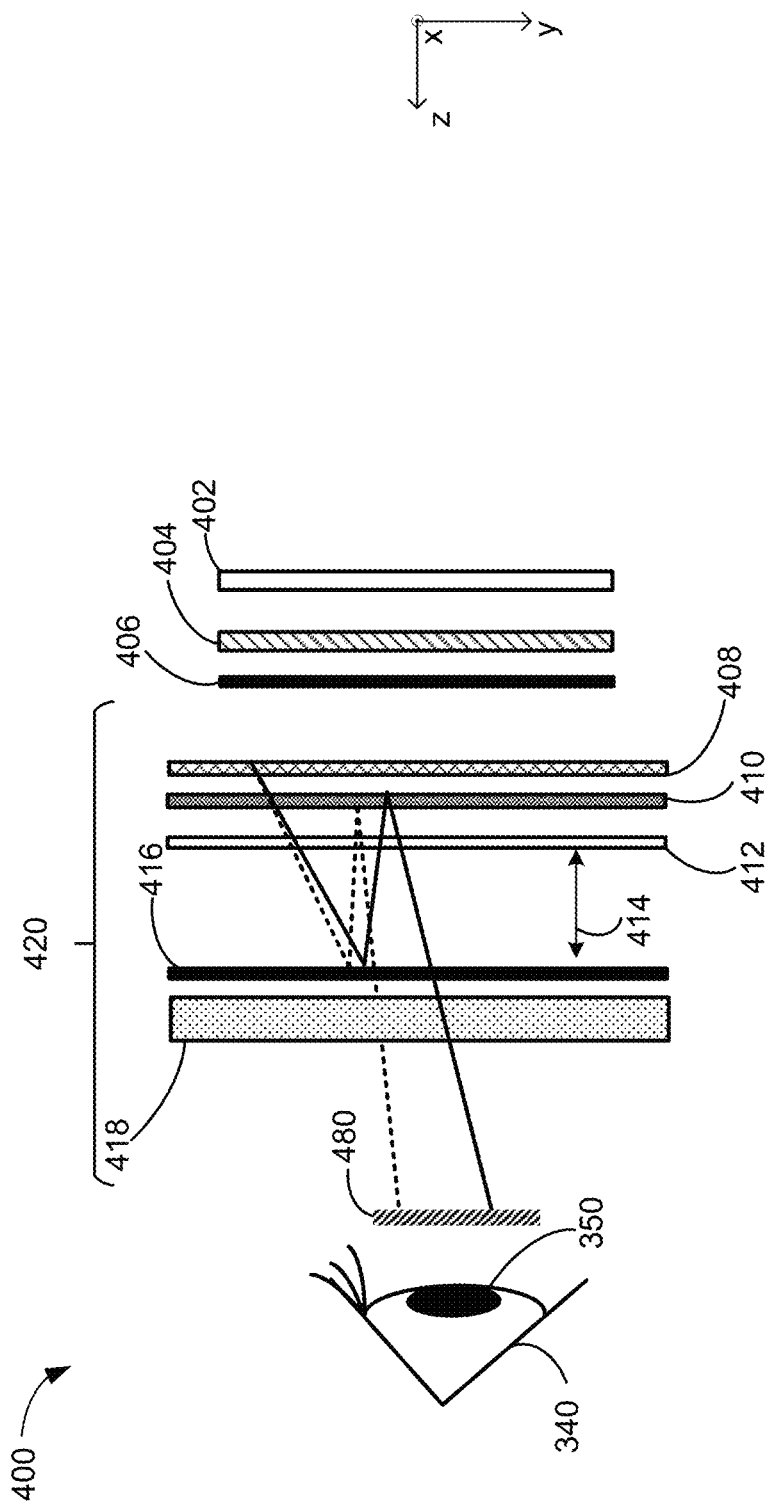
FIG. 4A is a schematic diagram illustrating a head-mounted display device in accordance with some embodiments.

FIG. 4A is a schematic diagram illustrating a head-mounted display device in accordance with some embodiments.

The head-mounted display device 400 includes a display panel 406, a circular polarizer 408, a first partial reflector 410, a phase retarder 412 (e.g., an optical phase retarder, such as a quarter waveplate), a second partial reflector 416, a cavity 414 (e.g., an air gap) between the phase retarder 412 and the second partial reflector 416, and an optional first optical element 418. "Partial reflectors" include optical elements that fully reflect (e.g., 100%) light of one polarization (e.g., a reflective polarizer). In some embodiments, the head-mounted display device 400 also includes one or more of: a backlight 402 and a linear absorptive polarizer 404 as shown in FIG. 4A.

Although FIG. 4A illustrates a single eye 340, a person having ordinary skill in the art would understand that the head-mounted display device 400 may work with both eyes of a wearer.

In some embodiments, the first partial reflector 410 and the second partial reflector 416 jointly constitute an optical assembly 420. In some embodiments, the optical assembly 420 also includes the optional first optical element 418, the phase retarder 412, and/or the circular polarizer 408.

In some embodiments, the first optical element 418 is absent from the head-mounted display device 400. In some embodiments, the phase retarder 412 is absent from the head-mounted display device (e.g., when the polarization states of the light do not require additional phase shifts).

The optical assembly 420 includes one or more elements that have diffractive power. For example, one or more of the first partial reflector 410, the second partial reflector 416, and the first optical element 418 have diffractive power (e.g., an optical power caused by diffraction).

In some embodiments, the diffractive surfaces of each of the first partial reflector 410, second partial reflector 416, and the first optical element 418 act independently on light impinging on each of the diffractive surfaces. In some embodiments, one or more of the first partial reflector 410, second partial reflector 416, and the first optical element 418 have optical power. In some embodiments, the diffractive surfaces define different phase profiles for each of the red (R), green (G), and blue (B) wavelengths. Red wavelengths span ~635 nm-~700 nm, green wavelengths span ~520 nm-~560 nm, and blue wavelengths span ~450 nm-~490 nm. In some embodiments, one or more of the first partial reflector 410, the second partial reflector 416, and the first optical element 418 have freeform phase profiles. Such freeform phase surfaces that are not expressible as an interference between two spherical waves, or interference between a spherical wave and plane wave may be used to provide optical performance that is otherwise not available with non-freeform phase profiles. For example, in some cases, the freeform phase surfaces are configured to give the highest modulation transfer function (MTF) over all light fields in the desired eyebox. In some cases, the freeform phase profiles may be described radially by a polynomial. In some cases, the polynomial may have 1-8 terms. In some cases, the freeform phase profiles are described using Forbes, Zernike, or phi-polynomials.

In some embodiments, a thickness of the head-mounted display device 400 (e.g., backlight 402 to either the second partial reflector 416 or the first optical element 418) is between 5-15 mm.

In some embodiments, the head-mounted display device 400 uses wavelength sensitive elements instead of correcting for dispersion. Dispersion refers to variations of the phase velocity of a light wave as a function of a frequency of the light wave. For example, using wavelength sensitive elements for R, G, B include using optical elements tailored for a particular wavelength range, instead of using a single optical element for all wavelengths and correcting for difference in optical responses at different wavelengths.

First Partial Reflector 410

In some embodiments, the first partial reflector is a polarization-independent partial reflector that transmits a substantial portion of incident light regardless of its polarization and reflects a substantial portion of the incident light regardless of its polarization. In some cases, a polarization-independent partial reflector refers to an optical element that transmits a substantial portion (e.g., at least 10%, 15%, or 20%) of incident light having a first polarization and a substantial portion (e.g., at least 10%, 15%, or 20%) of incident light having a second polarization that is orthogonal to the first polarization, and reflects a substantial portion (e.g., at least 10%, 15%, or 20%) of the incident light having the first polarization and a substantial portion (e.g., at least 10%, 15%, or 20%) of the incident light having the second polarization. In some embodiments, a polarization-independent partial reflector has the same reflectance or transmittance for the light having the first polarization and the light having the second polarization. However, a polarization-independent partial reflector need not have the same reflectance or transmittance for the light having the first polarization and the light having the second polarization (e.g., the polarization-independent partial reflector may have 50% reflectance for p-polarization and 40% reflectance for s-polarization; alternatively, the polarization-independent partial reflector may have 40% transmittance for p-polarization and 60% transmittance for s-polarization). Thus, in some embodiments, a polarization-independent partial reflector has different reflectances for the light having the first polarization and the light having the second polarization. In some cases, the polarization-independent partial reflector is a 50:50 mirror transmitting 50% of incoming light and reflecting the remaining 50% of incoming light. Alternatively, the polarization-independent partial reflector may have a different transmittance (e.g., between 20% and 80%, and more specifically between 40% and 60%, such as 20%, 30%, 40%, 45%, 55%, 60%, 70%, 80%, etc.) and a different reflectance (e.g., between 20% and 80%, and more specifically between 40% and 60%, such as 20%, 30%, 40%, 45%, 55%, 60%, 70%, 80%, etc.).

In some embodiments, the first partial reflector is a polarization-sensitive partial reflector. In some cases, a polarization-sensitive partial reflector refers to an optical element that reflects a substantial portion (e.g., at least 10%, 15%, or 20%) of incident light having a first polarization without reflecting a substantial portion (e.g., at least 10%, 15%, or 20%) of incident light having a second polarization that is orthogonal to the first polarization, and transmits a substantial portion (e.g., at least 10%, 15%, or 20%) of the incident light having the second polarization. In some cases, the polarization-sensitive partial reflector does not transmit a substantial portion (e.g., at least 10%, 15%, or 20%) of the incident light having the first polarization. For example, a polarization-sensitive partial reflector may reflect at least 80% of left circularly polarized light (and transmit less than 20% of left circularly polarized light) and transmit at least 90% of right circularly polarized light (and reflects less than 10% of right circularly polarized light). In some embodiments, the first partial reflector is a reflective holographic element (e.g., a volume Bragg grating (VBG), a polarization volume hologram (PVH), a Pancharatnam-Berry phase (PBP) element). There is further description of diffractive/holographic elements below.

Second Partial Reflector 416

In configurations that do not include the first optical element 418, the second partial reflector 416 defines an output plane of the optical assembly 420. In some embodiments, the second partial reflector 416 is polarization sensitive and allows light having a particular polarization to exit the optical assembly 420 (e.g., by transmitting the light having the particular polarization) and prevents light having a polarization different from (e.g., orthogonal to) the particular polarization (e.g., by reflecting the light having the different polarization). In some embodiments, it is a reflective polarizer (e.g., a flat reflective polarizer). In some cases, a reflective polarizer reflects light having a first linear polarization (e.g., s-polarization) and transmits light having a second linear polarization (e.g., p-polarization) that is orthogonal to the first linear polarization. In some embodiments, the second partial reflector 416 is a PVH. In some cases, PVH reflects a first circularly polarized light (e.g., left circularly polarized light) and transmits a second circularly polarized light (e.g., right circularly polarized light) that is orthogonal to the first circularly polarized light. In some embodiments, the second partial reflector 416 is configured to have optical power.

In the accompanying figures, polarization of light is annotated with universal annotations that do not take into account a propagation direction of a respective ray (e.g., the right-handed circularly polarized light is annotated with a counter-clockwise arrow regardless of the propagation direction of light, and the left-handed circularly polarized light is annotated with a clockwise arrow regardless of the propagation direction of light). FIGS. 4B-4E are described independently of each other. For example, a first direction in any one of FIGS. 4B-4E is not necessarily a same direction as a first direction in another one of FIGS. 4B-4E.

A Reflective Polarizer as the Second Partial Reflector 416

Figure 4B:
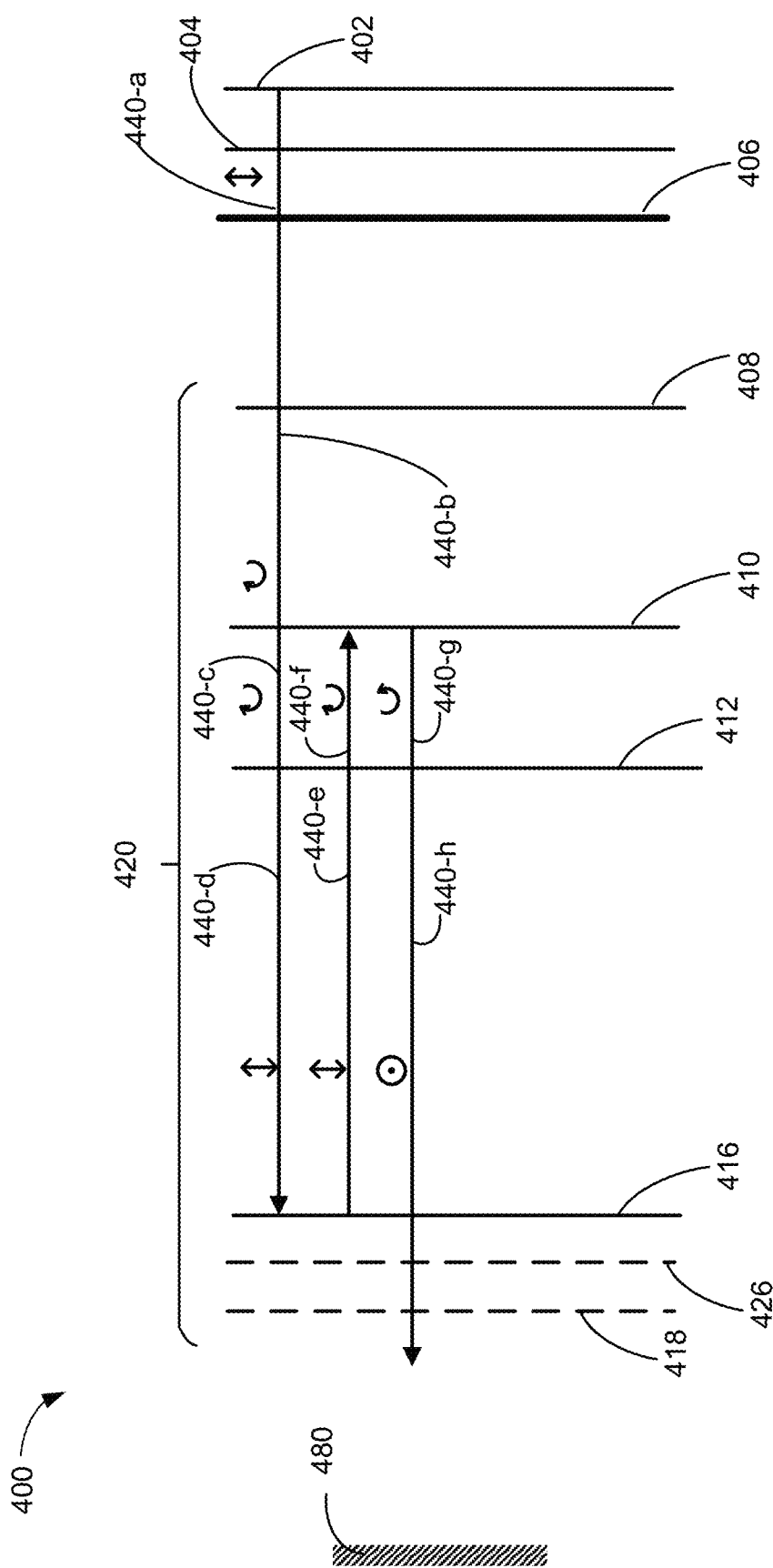
FIG. 4B is a schematic diagram illustrating polarization states of light passing through a head-mounted display device in accordance with some embodiments.

FIG. 4B is a schematic diagram illustrating polarization states of light passing through the head-mounted display device 400 in accordance with some embodiments. In FIG. 4B, the first partial reflector 410 is a VBG and the second partial reflector 416 is a reflective polarizer. In some embodiments, the reflective polarizer is positioned to reflect vertically polarized light and transmits horizontally polarized light (or vice versa). The linear polarizer 404 transmits light 440-*a*, having a vertical polarization, toward the transmissive display panel 406 from the backlight 402. A portion of the linearly polarized light 440-*a* passes through the circular polarizer 408 as light 440-*b* that is left circularly polarized. Alternatively, an optical phase retarder (e.g., a quarter waveplate) may be used in place of the circular polarizer 408 to convert the linearly polarized light (e.g., vertically polarized light) to a circularly polarized light (e.g., left circularly polarized light). The first partial reflector 410 transmits a portion of (e.g., 50%, 60%, 70%, 80%, 90%, 100%) the light 440-*b* as light 440-*c*, while maintaining its polarization (e.g., left circular polarization). In some embodiments, when the first partial reflector 410 is a VBG, the VBG transmits approximately 50% of incident light, independently of its polarization. The light 440-*c* passes through the phase retarder 412. When the phase retarder 412 is a quarter waveplate, the light 440-*c* becomes light 440-*d*, which is vertically polarized. The reflective polarizer (the second partial reflector 416) reflects the vertically polarized light as light 440-*e*, back toward the quarter waveplate 412, while maintaining its linear polarization. The quarter waveplate 412 changes the light 440-*e* to left circularly polarized light 440-*f*. The first partial reflector 410, which is a VBG in the embodiments shown in FIG. 4B, reflects the light 440-*f* as light 440-*g*, having a different (e.g., orthogonal) polarization, such that the light 440-*g* is right circularly polarized. The light 440-*g* is converted into horizontally polarized light 440-*h* after passing through the quarter waveplate 412. The horizontally polarized light 440-*h* is transmitted through the reflective polarizer (the second partial reflector 416) toward eyebox 480.

In some embodiments, a linear polarizer 426 is placed downstream of the second partial reflector 416 (e.g., so that the second partial reflector 416 is located between the linear polarizer and the first partial reflector 410). The linear polarizer 426 is positioned to block a portion of the light 440-*d* (e.g., having the vertical linear polarization), if any, transmitted through the second partial reflector 416 and transmit the light 440-*h* (e.g., having the horizontal polarization).

In some embodiments, the head-mounted display device 400 includes a first optical element 418, and the light 440-*h* passes through the first optical element 418 on its way to the eyebox 480. In configurations where the first optical element 418 is configured to provide optical power, the first optical element 418 may focus or defocus the light 440-*h*.

In some embodiments, the second partial reflector 416 is a polarization-independent partial reflector (e.g., a partial mirror, such as a 50:50 mirror) or a VBG, instead of a reflective polarizer.

A Reflective Polarization Volume Hologram (PVH) as the Second Partial Reflector 416

Figure 4C:
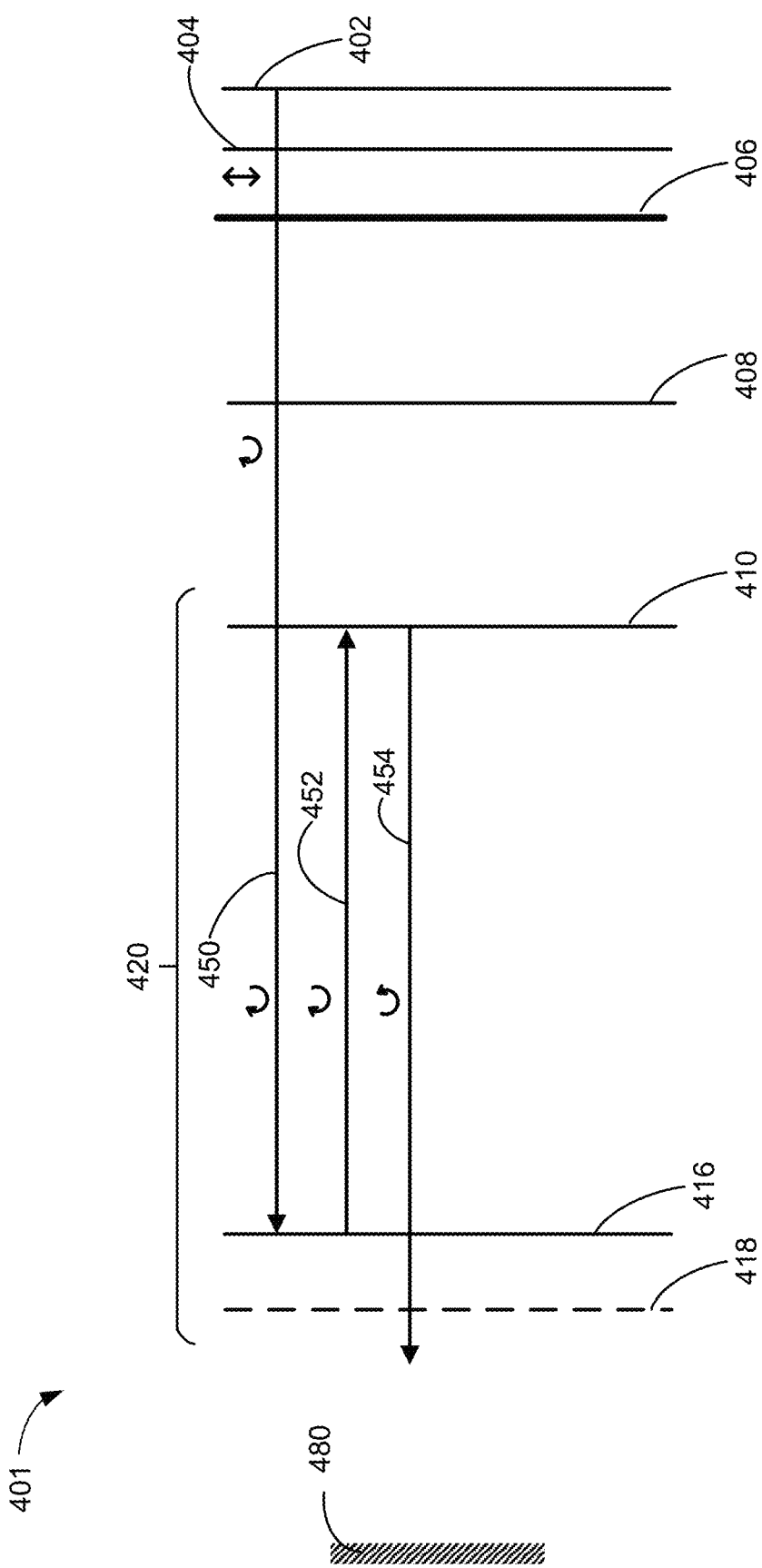
FIG. 4C is a schematic diagram illustrating polarization states of light passing through a head-mounted display device in accordance with some embodiments.

FIG. 4C is a schematic diagram illustrating polarization states of light passing through a head-mounted display device 401 in accordance with some embodiments. The head-mounted display device 401 is similar to the head-mounted display device 400 shown in FIG. 4B, except that the second partial reflector 416 is a reflective PVH and the phase retarder 412 (shown in FIG. 4B) is omitted. PVH may be configured to maintain circular polarization of reflected light. For example, first light 450 having a first circular polarization (e.g., left circularly polarized light) impinges on the reflective PVH and is reflected as second light 452 having the same first circular polarization (e.g., left circularly polarized light). Thus, in such embodiments, the phase retarder 412 (shown in FIG. 4B) may be omitted in the optical assembly 420. The second light 452 having the first polarization changes to third light 454 having a second polarization (e.g., right circularly polarized light) distinct from the first polarization when the second light 452 is reflected by the first partial reflector 410 (e.g., the first partial reflector 410 is a polarization-independent partial reflector or a VBG). The third light 454 having the second polarization exits the optical assembly 420 when it is transmitted through the reflective PVH (second partial reflector 416).

In some embodiments, the first partial reflector 410 is a polarization-independent partial reflector (e.g., a partial mirror, such as a 50:50 mirror) or a VBG, instead of a PVH.

A Polarization-Independent Partial Reflector as the Second Partial Reflector 416

In some embodiments, a head-mounted display device similar to the head-mounted display device 400 shown in FIG. 4B includes a polarization-independent partial reflector (e.g., a partial mirror, such as a 50:50 mirror transmitting 50% of incoming light and reflecting the remaining 50% of incoming light, or a partial mirror having a transmittance other than 50% and a reflectance other than 50%) as the second partial reflector 416 instead of a reflective polarizer. In such a configuration, the linear polarizer 426 is effective in reducing any ghost image caused by a portion of the light 440-*d* that is transmitted through the second partial reflector 416.

In some embodiments, the first partial reflector 410 is a VBG or a polarization-independent partial reflector (e.g., a partial mirror, such as a 50:50 mirror). In some embodiments, the first partial reflector 410 is a PVH.

A VBG as the Second Partial Reflector 416 or the First Partial Reflector 410

Figure 4D:
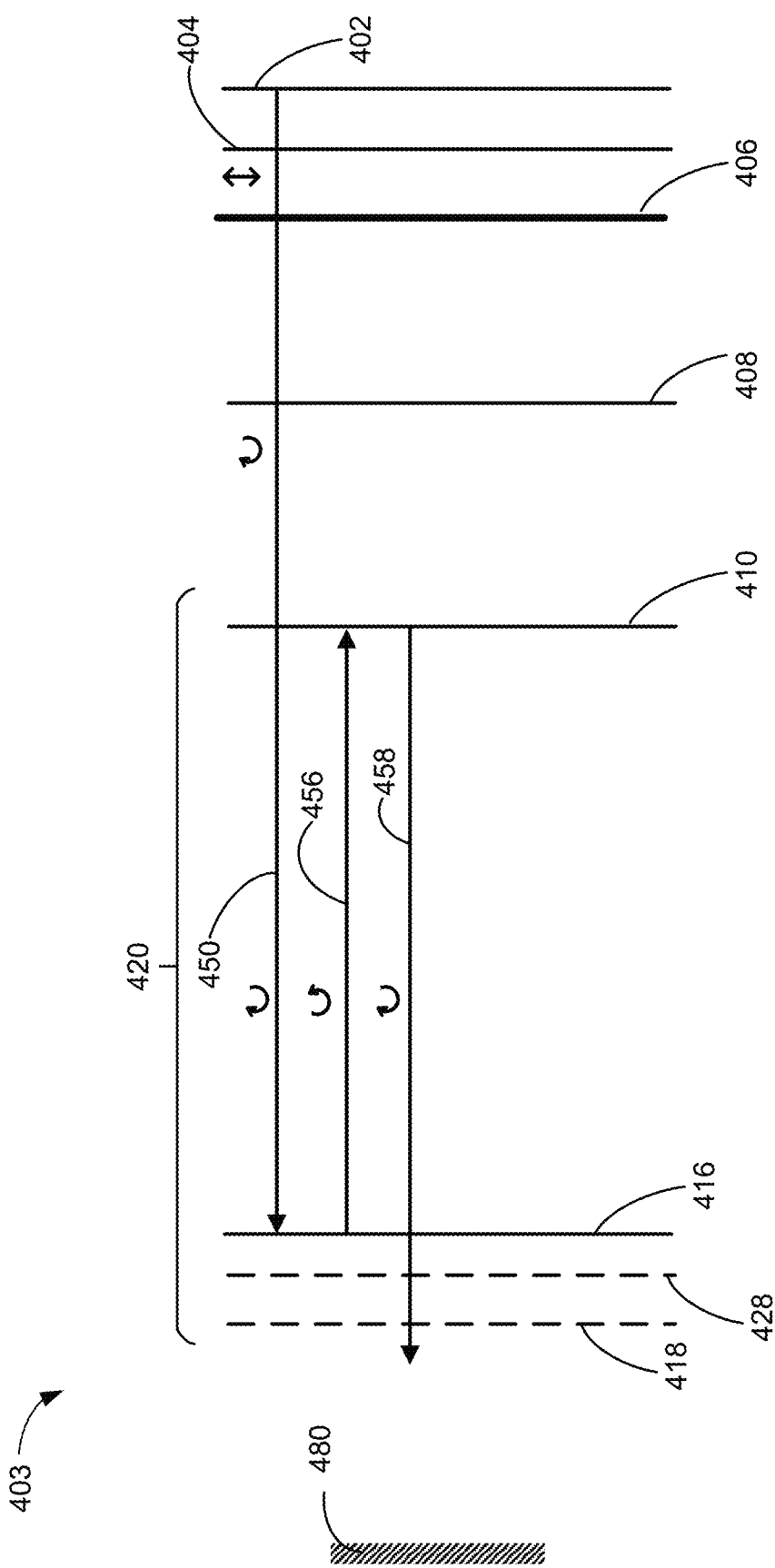
FIG. 4D is a schematic diagram illustrating polarization states of light passing through a head-mounted display device in accordance with some embodiments.

FIG. 4D is a schematic diagram illustrating polarization states of light passing through a head-mounted display device 403 in accordance with some embodiments. The head-mounted display device 403 is similar to the head-mounted display device 401 shown in FIG. 4C, except that the first partial reflector 410 is either a partial mirror or a VBG and the second partial reflector 416 is either a partial mirror or a VBG. For example, in some configurations, the first partial reflector 410 is a partial mirror and the second partial reflector 416 is a VBG. In some other configurations, the first partial reflector 410 is a VBG and the second partial reflector 416 is a partial mirror. In yet some other configurations, the first partial reflector 410 is a VBG and the second partial reflector 416 is a VBG. These configurations cause reflection of first light 450 having a first polarization (e.g., left circularly polarized light) and impinging on the second partial reflector 416 as second light 456 having a second polarization (e.g., right circularly polarized light) different from (e.g., orthogonal to) the first polarization. The first partial reflector 410 reflects the second light 456 having the second polarization as third light 458 having the first polarization (e.g., left circularly polarized light), which is transmitted through the second partial reflector 416. However, in some embodiments, at least one of the first partial reflector 410 and the second partial reflector 416 is not a partial mirror.

In some embodiments, the head-mounted display device 403 includes a polarizer 428 (e.g., a circular polarizer or a linear polarizer). The polarizer 428 is placed downstream of the second partial reflector 416 (e.g., so that the second partial reflector 416 is located between the polarizer 428 and the first partial reflector 410). The polarizer 428 is positioned to block a portion of the light 450 (e.g., having the left circular polarization), if any, transmitted through the second partial reflector 416 and transmit the light 458 (e.g., having the horizontal polarization).

First Optical Element 418

In some embodiments, the first optical element 418 is a transmissive diffractive element (e.g., VBG, PBP element, PVH, etc.). In some embodiments, the head-mounted display device 400 (or the head-mounted display device 401 or 403) does not include the first optical element.

Figure 4E:
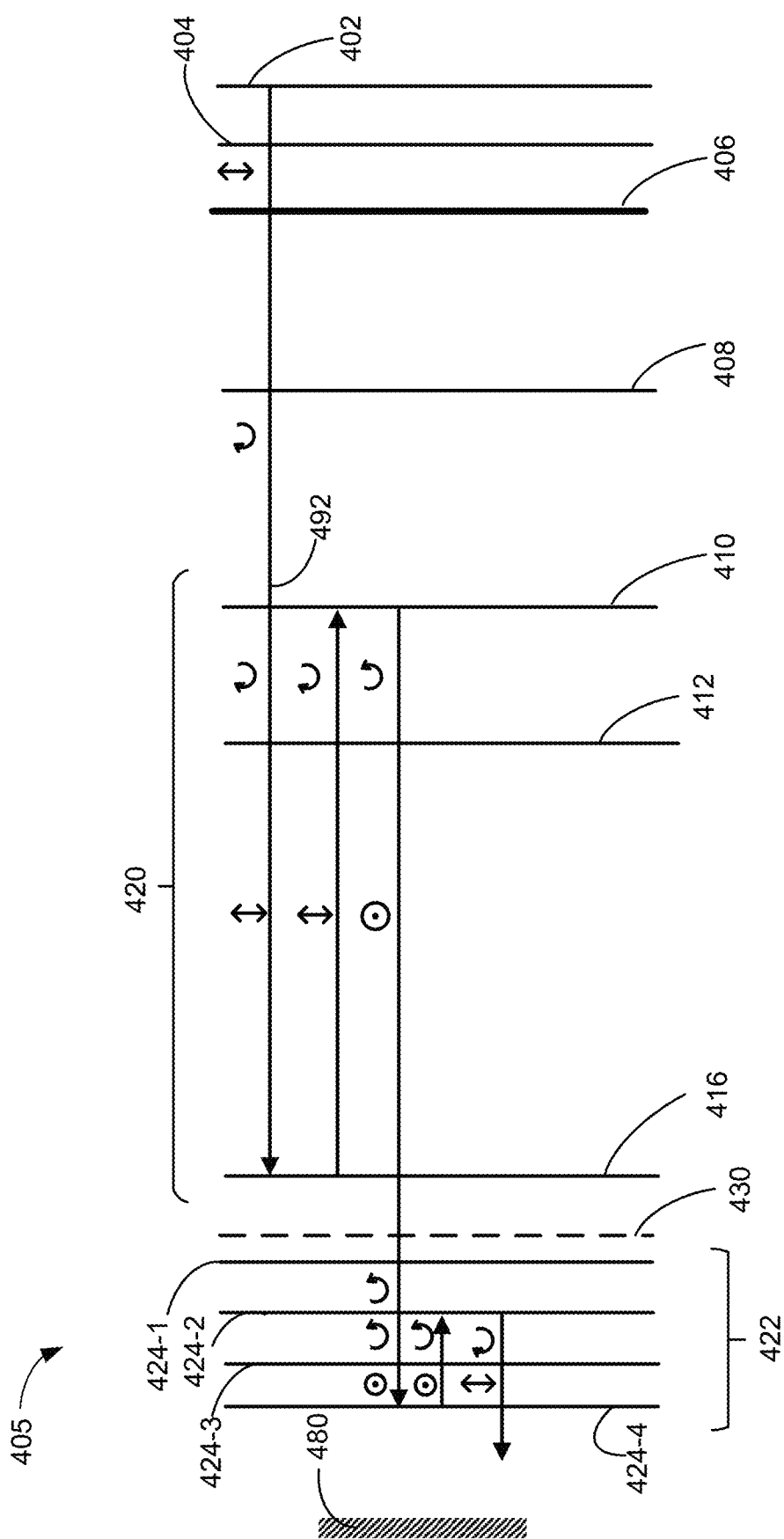
FIG. 4E is a schematic diagram illustrating polarization states of light passing through a head-mounted display device in accordance with some embodiments.

FIG. 4E is a schematic diagram illustrating polarization states of light passing through a head-mounted display device 405 in accordance with some embodiments. The head-mounted display device 405 is similar to the head-mounted display device 400 shown in FIG. 4B, except that the head-mounted display device 405 includes a second optical assembly 422 in place of the first optical element 418. In some configurations, the second optical assembly 422 operates as a third partial reflector. The second optical assembly 422 includes circular polarizer 424-1, partial reflector 424-2, phase retarder 424-3, and second partial reflector 424-4, arranged in a similar order as the circular polarizer 408, the first partial reflector 410, the phase retarder 412, and second partial reflector 416 in the optical assembly 420.

The second partial reflector 424-4, in some embodiments as shown in FIG. 4E, reflects horizontally polarized light and transmits vertically polarized light. The circular polarizer 424-1 in the second optical assembly 422 converts at least a portion of the horizontally polarized light transmitted through the second partial reflector 416 into circularly polarized light (e.g., right circularly polarized light), which passes through the first partial reflector 424-2. In some embodiments, the phase retarder 424-3 is a quarter waveplate that converts the right circularly polarized light into horizontally polarized light, which is reflected back toward the quarter waveplate (phase retarder 424-3) by the second partial reflector 424-4. The quarter waveplate 424-3 turns the horizontally polarized light into left circularly polarized light, which is reflected by the first partial reflector 424-2. The reflected light maintains its polarization and is converted into vertically polarized light by the quarter waveplate (phase retarder 424-3).

In some embodiments, the head-mounted display device 405 includes a phase retarder 430 (e.g., a quarter waveplate). The phase retarder 430 converts a polarization of the light from the second partial reflector 416 (e.g., from the horizontal polarization to the right circular polarization). In some embodiments, when the head-mounted display device 405 includes the phase retarder 430, the head-mounted display device 405 may not include the circular polarizer 424-1 (e.g., the head-mounted display device 405 may include the phase retarder 430 in addition to, or instead of, the circular polarizer 424-1).

In some embodiments, a cavity (not drawn to scale in FIG. 4E) between the phase retarder 424-3 and the second partial reflector 424-4 is approximately zero.

In FIG. 4E, the second optical assembly 422 replaces a transmissive first optical element 418 (shown in FIG. 4B) with a series of reflective elements (e.g., first partial reflector 424-2 and second partial reflector 424-4). An advantage of using a reflective element, such as the second optical assembly 422, is its ability to reflect zeroth order leakage light back towards the display panel 406, away from the eyebox 480, thereby improving a contrast at the eyebox 480 between a dark pixel and a bright pixel of the display.

In some embodiments, phase profiles of one or more of the first partial reflector 410, the second partial reflector 416, and the first optical element 418 shown in FIGS. 4A-4D are freeform (e.g., one or more of the first partial reflector 410, the second partial reflector 416, and the first optical element 418 are freeform optics). In some embodiments, phase profiles of one or more of the first partial reflector 410, the second partial reflector 416, the first partial reflector 424-2, and the second partial reflector 424-4 shown in FIG. 4E are freeform.

Light Source

In some embodiments, the light source for the head-mounted display device 400 is a laser that supplies light to the backlight 402. In some embodiments, the laser has a narrow spectrum of less than 2 nm (e.g., less than 1 nm, between 0.1 to 1 nm). In some embodiments, three or more lasers supply light at different wavelengths to the backlight 402, illuminating the display panel 406 at R, G, B colors. In some embodiments, more than three lasers are used to increase the color gamut. In some embodiments, a wavelength of the laser(s) is selected to maximize color gamut and/or perceptual sensitivity.

In some embodiments, the laser uses active control (e.g. a photodiode control loop) and/or passive control (e.g., VBG stabilization grating) to control a wavelength or spectrum of light emitted from the laser.

In some embodiments, multiple lasers are configured to have a common polarization that is matched to the designed polarization of the head-mounted display device 400. In such embodiments, common polarization optics can be used for light from the multiple lasers.

Light sources having a wider spectrum have limited resolution in the peripheral field of view (FOV). Due to dispersion, different wavelengths are diffracted at different angles and blur out the image. In contrast, light sources having a narrower spectrum have longer coherence length that can lead to greater laser speckle. The spectrum of the laser light source is selected to balance the resolution of peripheral FOV and the extent of laser speckle.

In some embodiments, light emitting diodes (LED) are used as the light source. Examples of light emitting diodes include inorganic light emitting diodes (ILED), superluminescent light emitting diode (SLED), and organic light-emitting diode (OLED). In some embodiments, similar to using lasers, three or more LEDs covering the R, G, B, wavelengths are used. Alternatively, in some embodiments, a white LED is used when the display panel 406 has color filters (e.g., for each of the R, G, B wavelengths).

In some embodiments, light from the LEDs is filtered (e.g., by color filters). In some embodiments, color conversion materials (e.g. quantum dots) are placed in an optical path of the LED to modify (e.g., shift and/or narrow) the spectrum of light delivered to the display panel 406 and the eyebox 480.

In some embodiments, light sources are directly coupled to the backlight 402. In some embodiments, light sources deliver light to downstream optics (e.g., backlight 402, linear polarizer 404) through a shared optical fiber. In some embodiments, the light source coupled into the optical fiber is located away from the optical assembly 420 in the head mounted display device 400. In some embodiments, the light source coupled into the optical fiber is located off the headset (e.g. in a puck placed on a belt or in a pocket) and the light from the light source travels along the optical fiber for delivery to the head mounted display device 400. In some embodiments, the optical fiber used to couple the light from the light source to downstream optics is polarization maintaining.

In some embodiments, the light sources are configured to provide pulsed light (e.g., having a pulse width less than 50 ms, 40 ms, 30 ms, 20 ms, 10 ms, 5 ms, 3 ms, 2 ms, or 1 ms). In some embodiments, the pulsed light is used to control display persistence (e.g., reduce motion blur from display persistence). In some embodiments, the light sources are pulsed for color sequential illumination, such that each color is cycled through at a selected framerate. For example, each of the three colors is pulsed at 180 Hz, to be used with a matching display panel 406 to create a 60 Hz color display.

In some embodiments, wavelengths of the light sources are chosen to match wavelength ranges in which the diffractive elements have the highest efficiency.

Despeckler

Light sources that have high coherence (e.g. laser) can cause an image formed by light from the light sources to have speckle (e.g., a granular pattern) or noise. In some embodiments, a despeckler is used to reduce the speckle. In some embodiments, the despeckler has a time-varying random phase pattern that provides temporal and angular variation to "blur" out the noise over time. With the use of a despeckler, a narrow spectrum may be used to provides high resolution for the head-mounted display device 400 while reducing the speckle.

In some embodiments, the despeckler is mechanical (e.g., includes a rotating diffuser screen). In some embodiments, the despeckler is non-mechanical (e.g., includes an electroactive polymer that undergoes deformations at frequencies of a few hundred Hz based on electrical field applied to it).

While a despeckler can potentially be placed anywhere between the light source and the display panel 406, placing the despeckler near the light source allows an area of the despeckler to be kept small when the light source is divergent. The angular range and the feature size of the despeckler are selected to eliminate the speckle while maintaining the etendue of the light. For example, the angular spread emerging from the desplecker after the time-varying random phase pattern has interacted with the light from the light source should also be small enough so that all light is collected though rest of optical system without reducing efficiency.

In some embodiments, the despeckler maintains a polarization of the light source. This reduces polarization-associated loss, thereby maintaining an efficiency of the head-mounted display device 400. In some embodiments, the light from the light source is despeckled before injection into an optical fiber, in which case a multi-mode optical fiber is used.

Backlight 402

Figure 5A:
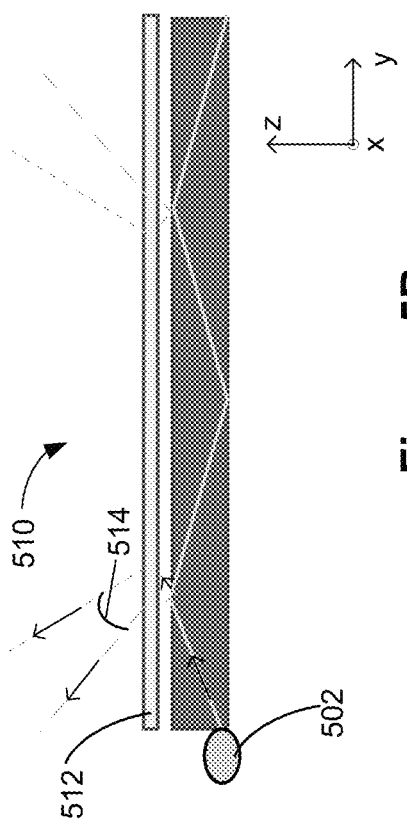
FIG. 5A is a schematic diagram illustrating a conventional backlight.

In some embodiments, the backlight 402 is a conventional backlight 500 as shown in FIG. 5A, in which a light source 502 is coupled into an edge of a light guide 504. The light guide 504 has etched features 506 that outcouple light by causing diffusion of the light (e.g., a span of 180° adjacent to a surface of the light guide 504).

Figure 5B:
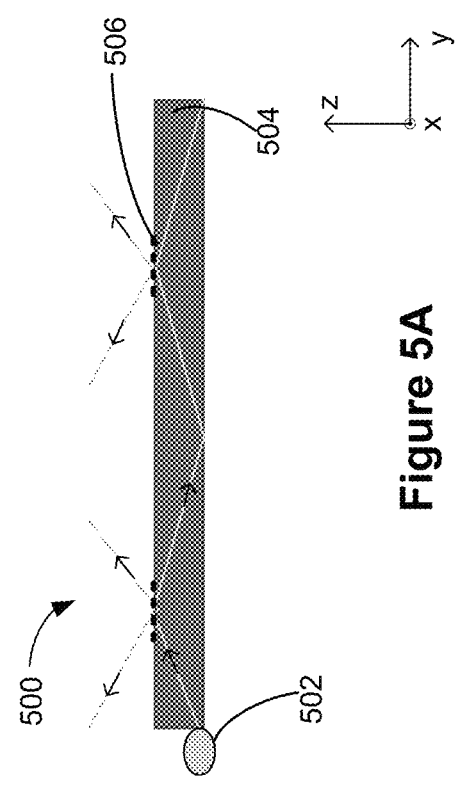
FIGS. 5B-5F are schematic diagrams illustrating various directional backlight in accordance with some embodiments.

In some embodiments, the backlight 402 is a first directional backlight 510 as shown in FIG. 5B. In the first directional backlight 510, a first additional element 512 is placed on top of a conventional backlight to direct light into a preferential range of angles 514. In some embodiments, the first additional element 512 is a Fresnel lens. In some embodiments, the first additional element 512 is a diffractive/holographic optical element such as a surface relief grating (SRG), PBP, VBG or PVH. The configuration shown in 5B operates in transmission mode.

Figure 5C:

In some embodiments, the backlight 402 is a second directional backlight 520 as shown in FIG. 5C. In the second directional backlight 520, a second additional element 522 is placed on top of the conventional backlight to attenuate light so that light is outcoupled in a preferential range of angles. In some embodiments, the second additional element 522 is an angle controlling faceplate.

Figure 5D:
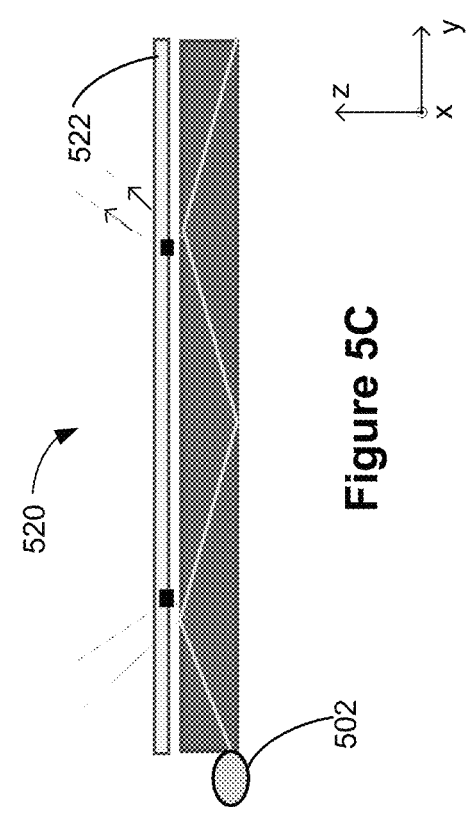

In some embodiments, the backlight 402 is a third directional backlight 530 as shown in FIG. 5D. The directional backlight 530 includes scattering features 532 chosen to scatter light in a selected range of angles. In some embodiments, the scattering features are part of a randomized, roughened surface similar to those in an engineered diffuser. In some cases, the scattering of the light in the preferential range of angles occurs via a stochastic process.

Figure 5F:
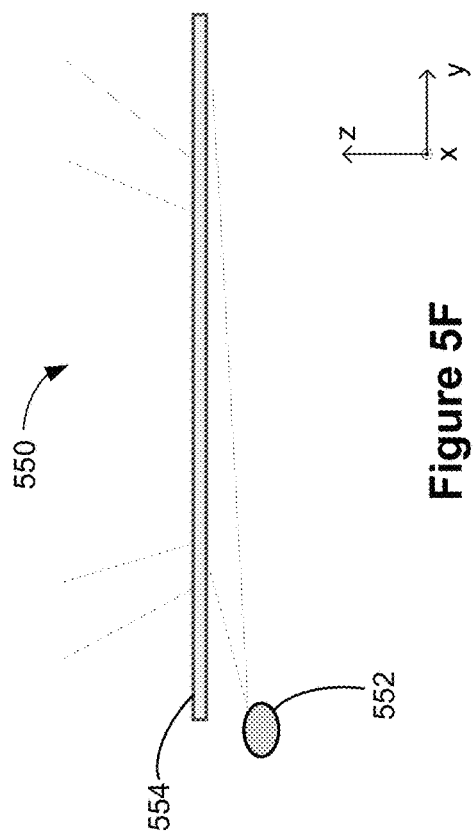
Figure 5E:
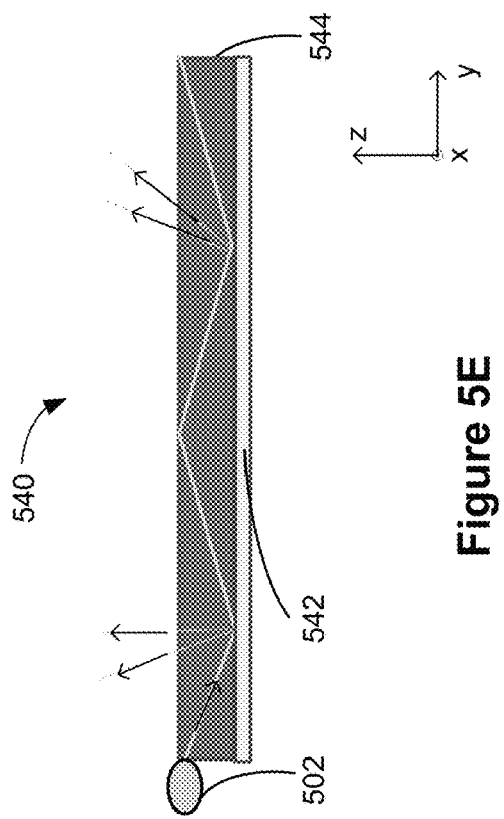

In some embodiments, the backlight 402 is a fourth directional backlight 540, as shown in FIG. 5E, having an outcoupling element 542 on the light guide 544. The configuration shown in 5E operates in reflection mode. In some embodiments, the outcoupling element 542 is a surface relief grating (SRG), VBG, PVH or other diffractive elements that outcouple light in a selected range of angles.

In some embodiments, the backlight 402 is a fifth directional backlight 550 having a Fresnel or diffractive/holographic element 554 (e.g. VBG, PBP, PVH, DOE, etc.) that is used to direct light from an off-axis source 552 through free space into a selected range of angles. In some embodiments, the fifth directional backlight 550 operates in a transmissive configuration as shown in FIG. 5F (e.g., the light from the Fresnel or diffractive/holographic element 554 emerges from a surface opposite to the off-axis source 552). In some embodiments, the fifth directional backlight operates in a reflective configuration (e.g., the light from the Fresnel or diffractive/holographic element 554 emerges from a surface facing the off-axis source 552).

Directional backlighting improves light efficiency and contrast. In some embodiments, a preferential range of angles of light emerging from the backlight 402 is selected to allow light within that preferential range to enter the eyebox 480. In some embodiments, the preferential range of angles is tuned to an angular selectivity of the diffractive/holographic optics in the head mounted display device 400.

In some embodiments, the emission angles vary spatially over the plane of the backlight 402 (e.g., the emission angles vary along the x-direction, the emission angles vary along the y-direction, the emission angles vary along both the x-direction and the y-direction, or the emission angles vary radially). In some embodiments, a range of emission angles is selected for each position on the backlight (e.g., at a particular coordinate (x,y) on the backlight 402) to match the desired eyebox size.

In some embodiments, the preferential range of angles is chosen to cause the light from the backlight 402 to form an approximate real or virtual point/area at some distance in front of or behind the display panel 406.

In some embodiments, the directional backlight steers light toward the pupil 350 of the eye 340. In some embodiments, for increased efficiency, directional backlight steers light towards the pupil 350 of the eye 340 by dynamically changing emission angles to those corresponding to tracked position of the pupil 350.

Display Panel 406

For a display panel 406 that is transmissive (e.g., LCD), the backlight 402 is placed behind (e.g., upstream along an optical path from the light source to the eyebox 480) the display panel 406 (e.g., the display panel 406 is located between the backlight 402 and the eyebox 480 or the optical assembly 420). In some embodiments, the light source includes a laser and color filters tuned to laser wavelengths. For example, the color filters may be high efficiency, narrow bandwidth filters that have high transmission at the wavelength ranges of the laser lines emitted by the light source. In some embodiments, light from each laser line is transmitted by a single color filter so that the transmission ranges of the color filters do not overlap. In some embodiments, color sequential backlight is used for higher efficiency.

For a display panel 406 that is reflective (e.g., Liquid Crystal-on-Silicon), a "front light" is placed in front of the display panel 406 (e.g., the light source is positioned in front of the display panel 406 at an oblique angle using a combining element or is emitted out of a transparent waveguide).

In some embodiments, the reflective display is color sequential. In some embodiments, the head-mounted display device includes light sources for more than three colors (e.g., uses yellow as a fourth color) so that the reflective display may reflect four or more colors of light to present an image. LCOS offers a high resolution and a high fill factor (e.g., a ratio between an area of a mirror (of a pixel) and a sum of the area of the mirror and a spacing between two adjacent mirrors). In some embodiments, for reflective displays operating in a color sequential mode, the color fields are adjusted individually based on head and/or eye tracking data to minimize perceived motion and/or color artifacts to a user of the head-mounted display device 400.

In some embodiments, the display panel 406 is an emissive display panel such as micro-LED or OLED, that generates its own light, and does not need (and thus, does not use) a separate backlight or light source. In some embodiments, the emission display panel have additional layers to control emission angle and/or spectrum, in a manner similar to those described with respect to FIGS. 5A-5F.

In some embodiments, the first partial reflector 410 is positioned adjacent to the display panel 406. In some embodiments, the first partial reflector 410 is in contact with the display panel 406.

Polarization Optics

In some embodiments, the head-mounted display device 400 uses phase retarders 412. In some embodiments, the phase retarders 412 are waveplates. In some embodiments, the waveplates are configured to provide uniform retardation (at quarter or half wave) over a broad angular and spectral range of the light sources. In some embodiments, the spectral performance of the waveplates (in the optical assembly 420 and/or the optical assembly 422) is tuned to specific laser lines of the light sources, rather than to the full visible spectrum. In some embodiments, a waveplate is a multilayer film, or a stretch film.

In some embodiments, the polarization optics in the head-mounted display device 400 includes a reflective polarizer. In some embodiments, the reflective polarizer is one selected from a group consisting of a wire grid, a polymer film, and a cholesteric liquid crystal structure. In some embodiments, the reflective polarizer is a PVH. In some embodiments, the reflective polarizer is tuned to laser lines of the laser light sources.

In some cases, zero order leakage in the optical components of the head-mounted display device causes a user of the head-mounted display device 400 to see a direct and unfocused view of the display panel or the light source. In some embodiments, polarization optics is tuned to reduce the zeroth order leakage. For example, zeroth order leakage is reduced by designing the polarization optics for normal incidence.

Diffractive/Holographic Elements

In some embodiments, the diffractive/holographic elements inside the optical assembly 420 provide a given optical prescription (including zero optical power) at three or more wavelengths. In some embodiments, the second partial reflector 416 has optical power.

VBG

In some embodiments, VBG is not polarization sensitive. In some embodiments, VBG is a transmissive element used as the first optical element 418. In some embodiments, VBG is a reflective element used as the first partial reflector 410.

In some embodiments, the VBG is recorded in a photopolymer. In some embodiments, the VBG is recorded using silver halide. In some embodiments, the VBG is recorded using dichromated gelatin.

In some embodiments, three (or more) holograms that act independently for at least the different colors (e.g., R, G, B wavelengths) are recorded in the VBG. In some embodiments, the VBG is recorded by multiplexing three holograms in the same element, resulting in a single layer element in which the three (or more) holograms are aligned.

In some embodiments, the VBG is formed by independently stacking separately recorded R, G, B holograms. In some embodiments, additional optical elements or features compensate for displacements between the holograms in the stack.

In some embodiments, the VBG is formed by shared stacking. In shared stacking, holograms for the R, G, B colors are recorded and shared between layers of the stack. The shared stacking VBG can include any number of layers. In some embodiments, no gap is left between the layers to reduce or eliminate interference between the layers.

In some embodiments, the refractive index modulation in the VBG is sufficient to give a desired diffraction efficiency for each multiplexed color (e.g., 50% to 100% efficiency for a respective color independent of the diffraction efficiency for any other color). In some embodiments, when a particular material does not provide sufficient refractive index modulation for each of the multiplexed color, stacking is employed so various multiplexed colors do not have to share the index modulation in a single element.

In some embodiments, the VBG has a thickness that supports a broad angular range, which, in turn, provides a desired eyebox size.

In some embodiments, multiple holograms are used when the recording material does not have sufficient angular selectivity to support a desired eyebox. In such a case, each of the multiple holograms is tuned for a portion of the angular selectivity corresponding to a part of the eyebox by tuning the angles of the recording beams. For example, for a VBG having a radially symmetric design, a first hologram provides a central disk and subsequent holograms record surrounding annuli (e.g., concentric rings) that fill out the eyebox. In some embodiments, the multiple holograms are recorded in a single element (e.g., multiplexed) or on multiple stacked element.

PVH

In some embodiments, PVH is used as a transmissive element. In some embodiments, PVH is used as a reflective element. In general, PVH is polarization sensitive and they can be used to add optical power to the second partial reflector 416. In some embodiments, multiple holograms are stacked to provide a broadband coverage (e.g., three holograms are stacked in a PVH to provide R, G, B coverage). In some embodiments, a single-layer gradient-pitch PVH reflects R, G, B. In some embodiments, a gradient-pitch PVH lens has different deflect/reflect angle, giving rise to different focal lengths for different wavelengths. Further details of gradient-pitch PVH are described in FIG. 7I.

PBP

Like PVH, PBP is a polarization sensitive element. In some embodiments, PBP is used as a transmissive first optical element 418. In some embodiments, PBP is wavelength sensitive and different phase profiles are provided for each color.

Metasurface

In some embodiments, at least one of the first partial reflector, the second partial reflector, and the first optical element includes a metasurface. A metasurface is a sheet material with sub-wavelength thickness. A metasurface includes either structured or unstructured with subwavelength-scaled patterns on the plane of the metasurface. In some embodiments, a metasurface is designed to provide a desired phase response at particular wavelengths. The desired phase response includes introducing a specific phase profile spatially along the x-y plane. For example, the spatial phase profile may be a quadratic phase modulation on the light field propagating through the metasurface, resulting in an effective optical lens effect of focusing the light field. In some embodiments, the metasurface is polarization sensitive.

Multi-Order Diffractive Optical Elements

In some embodiments, diffractive elements are designed to give a desired phase delay at multiple wavelengths by using a diffractive structure whose optical path length is an integer multiple of multiple wavelengths.

Ordinary Diffractive Elements

Ordinary diffractive surfaces such as surface relief gratings and ruled gratings, etc. generally cannot tune performance individually for multiple wavelengths. Instead, multiple surfaces are designed collectively to minimize dispersion over playback wavelengths.

Recording of Diffractive/Holographic Elements

In some embodiments, diffractive/holographic elements are recorded interferometrically or with a programmatically controlled phase profile.

In some embodiments, recording beams deviate from nominal profiles to compensate for material properties of the recording medium, such as shrinkage in the recorded hologram resulting in a different playback hologram than the intended/nominal hologram (in the absence of shrinkage).

In some embodiments, recording beams deviate from nominal profiles to compensate for different playback and recording wavelengths. For example, the hologram may be recorded at 532 nm but is played back at 520 nm.

In some embodiments, recording beams deviate from nominal profiles to compensate for different playback and recording angles. In some embodiments, recording beams deviate from nominal profiles to compensate for different placement of stacked elements.

In some embodiments, a minimum pitch of the diffractive elements is less than 1 micron. This is the pitch of the periodic structure/fringes in the diffractive structure.

The efficiency of the hologram may be tuned spatially and/or angularly to give approximately uniform intensity over the field of view and/or eyebox. For VBG, efficiency can be controlled by changing the refractive index modulation of the gratings. The refractive index modulation is changed by controlling the intensity of the recording beams spatially. In some embodiments, multiplexed holograms compensate for optical aberrations by recording different phase profiles for different angles.

In some embodiments, transmissive diffractive/holographic elements are stacked together. In some embodiments, the transmissive diffractive/holographic elements have different phase profiles to increase an optical power of the system and/or improve an optical correction within the head-mounted display device 400.

In some embodiments, phase profiles on one or more of the diffractive/holographic elements are tuned for the user of the head-mounted display device 400. For example, the phase profiles provide prescription vision correction to the user.

In some embodiments, polarization sensitive diffractive/holographic elements (e.g., PVH, PBP) are used in conjunction with additional polarizers to reduce zero-order leakage of light by "cleaning up" the polarization of light reflected or transmitted through the polarization sensitive elements.

In some cases, in which the diffractive/holographic elements have high optical power, the diffractive/holographic element can be very sensitive to alignment. In some embodiments, an optical stack of holograms is designed to self-compensate for thermal effects within each element (e.g., by selecting materials with complementary thermal expansion). This reduces the misalignment caused by thermal expansion of the holograms.

Varifocal

In some embodiments, a variable focus display is achieved using mechanical means, for example, by moving the display panel 406 away from the first partial reflector 410. In some embodiments, a variable focus display is achieved by changing the size of the cavity 414 (e.g., changing a distance between the first partial reflector 410 and the second partial reflector 416).

The embodiments disclosed herein are very lightweight and are high magnification optics that are ideal for mechanical focusing: the mass to be moved mechanically is low and the travel distance is very small. Depending on magnification, the required travel is generally in the range of 30-150 microns per diopter of focal change. Thus, anticipated configurations have a sub-millimeter range of motion throughout a large focus range.

In some embodiments, the head-mounted display device includes an amplified piezo actuator. An amplified piezo actuator is capable of inducing high precision, small scale motion. In some embodiments, direct piezo actuator, stepper motor, DC motor, or electrically controlled polymers are used. In some embodiments, rails or flexure arrays are used as a guidance mechanism.

In some embodiments, the varifocal mechanism is used to compensate for component alignment tolerances. For example, for misalignment due to assembly tolerances and thermal effects.

In some embodiments, the varifocal mechanism compensates for viewer eye aberrations (e.g. lens prescription), or optical aberrations (e.g. field curvature) at the tracked viewer eye position.

In some embodiments, an additional external focusing element, such as a liquid lens or PBP lens stack, is used to achieve varifocal ability.

Example Configuration 1

Figure 6A:
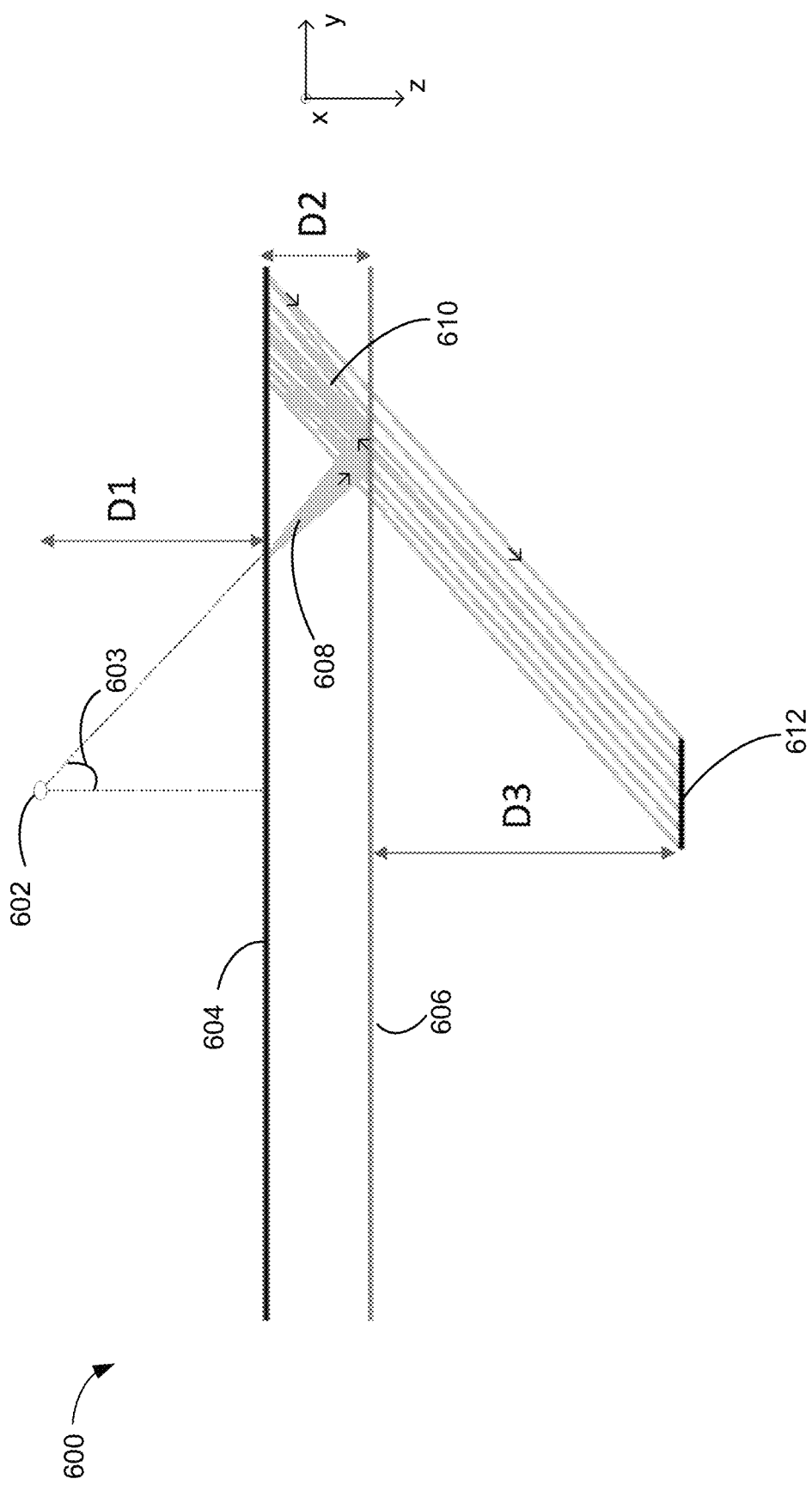
FIG. 6A is a schematic diagram illustrating a head-mounted display device in accordance with some embodiments.

FIG. 6A shows a head-mounted display device 600. A surface 604 denotes a stack of a display panel (e.g., 406 in FIG. 4A), a circular polarizer (e.g., 408 in FIG. 4A), a first partial reflector (e.g., 410 in FIG. 4A), and a phase retarder (e.g., 412 in FIG. 4A) for the head-mounted display device 600.

A surface 606 denotes the second partial reflector (e.g., the second partial reflector 416 in FIG. 4A), and D2 denotes the distance between the first partial reflector and a second partial reflector. A surface 612 denotes the eyebox (e.g., 480 in FIG. 4A). There is no first optical element in the head-mounted display device 600 of Example Configuration 1 shown in FIG. 6A.

In FIG. 6A, a light bundle 608 diverges from the surface 604. In some embodiments, a directional backlight (e.g., 402 in FIG. 4A) has light scattering features that direct light in a selected range of angles along the +z direction. In some embodiments, back-tracing the light in the preferential range of angles along the −z direction leads to a virtual point source 602 from which an emission cone 603 of light emanates. The virtual point source 602 is located at a distance D1 behind the surface 604. Light from the virtual point source 602 is relayed by optics in the head-mounted display device 600 to an eyebox of the user.

The first partial reflector in the head-mounted display device 600 is a reflective VBG and the second partial reflector is a reflective polarizer having no optical power. The light bundle 610 reflecting off the reflective polarizer impinges on the reflective VBG and is substantially retro-reflected. In this way, the reflective VBG supports a wide range of incidence angles of light (coming from the reflective polarizer), allowing the head-mounted display device 600 to have a large eyebox. In some embodiments, the reflective VBG contains planes of refractive index modulation that are substantially perpendicular to an incidence direction of the light bundle 610.

In some embodiments, the reflective VBG in the head-mounted display device 600 has a phase profile that focuses light from a point at a distance D4 from the VBG substantially back to the same point, akin to a spherical mirror focusing a point at a center of curvature back to the same point. In some embodiments, the second partial reflector is not placed at a focal plane of the first partial reflector.

In some embodiments, D2 is approximately 50 mm, 25 mm, 20 mm, 17.5 mm, 15 mm, 12.5 mm, or 10 mm. By folding the optical path in the optical assembly 420 and having the cavity D2, the head-mounted display device 600 is able to accommodate a longer focal length optics in a compact space.

Example Configuration 2

Figure 6B:
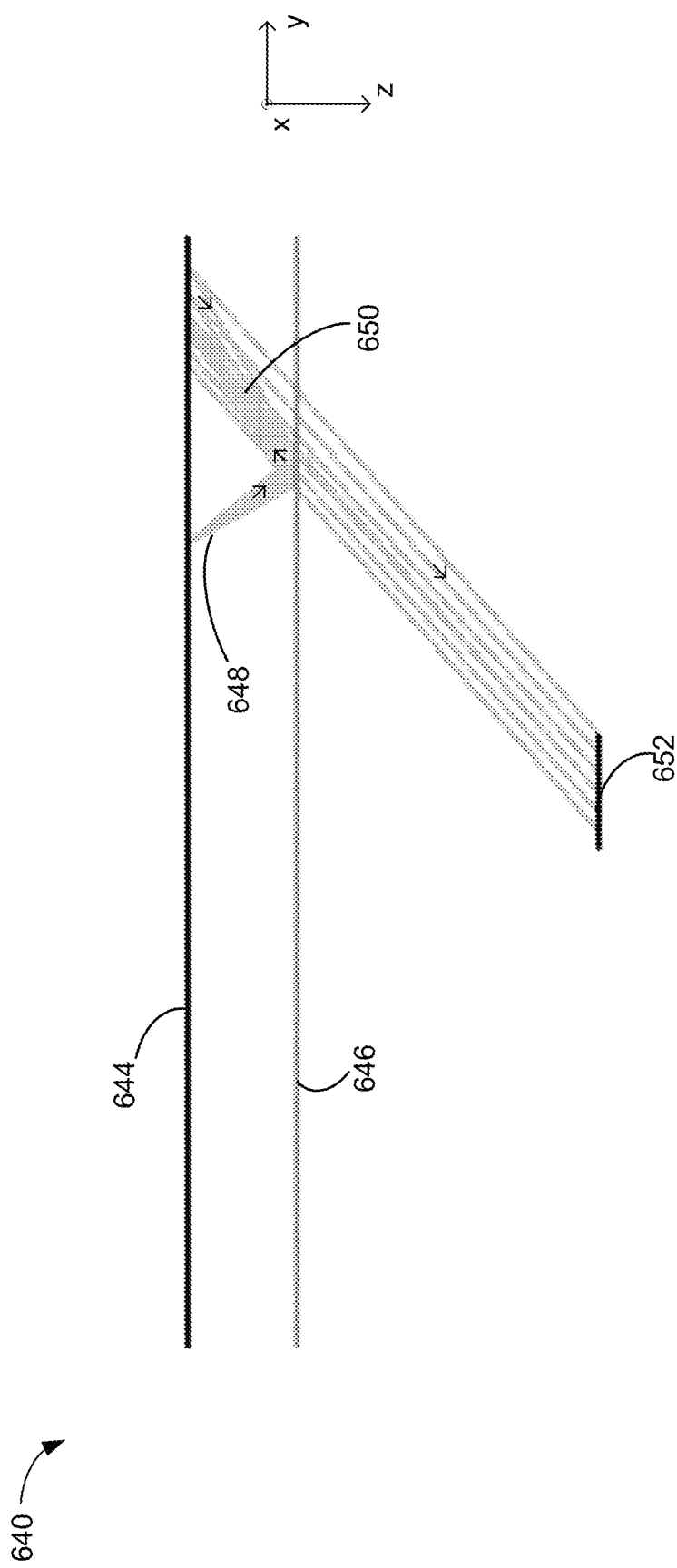
FIG. 6B is a schematic diagram illustrating a head-mounted display device in accordance with some embodiments.

FIG. 6B shows a head-mounted display device 640. A surface 644 denotes a stack of a display panel (e.g., 406 in FIG. 4A), a circular polarizer (e.g., 408 in FIG. 4A), and a first partial reflector (e.g., 410 in FIG. 4A). In some embodiments, the first partial reflector is a reflective VBG. In FIG. 6B, the reflective VBG operates substantially as a retroreflector and has a phase profile that focuses light from a point at a distance D4 from the VBG substantially back to the same point, as described above in reference to FIG. 6A. The head-mounted display device 640 shown in FIG. 6B has no first optical element.

A surface 646 denotes a second partial reflector, which is a PVH. In some embodiments, the PVH has lower optical power than the first partial reflector. In some embodiments, the PVH has primarily negative optical power.

The head-mounted display device 640 has two surfaces (the VBG and the PVH) that can correct optical aberrations in the optical system. In some embodiments, the PVH has a phase profile that corrects some of the aberrations that are present in the head-mounted display device 600 of Example Configuration 1. In some embodiments, the PVH has a freeform surface to reduce aberration.

Example Configuration 3

Figure 6C:
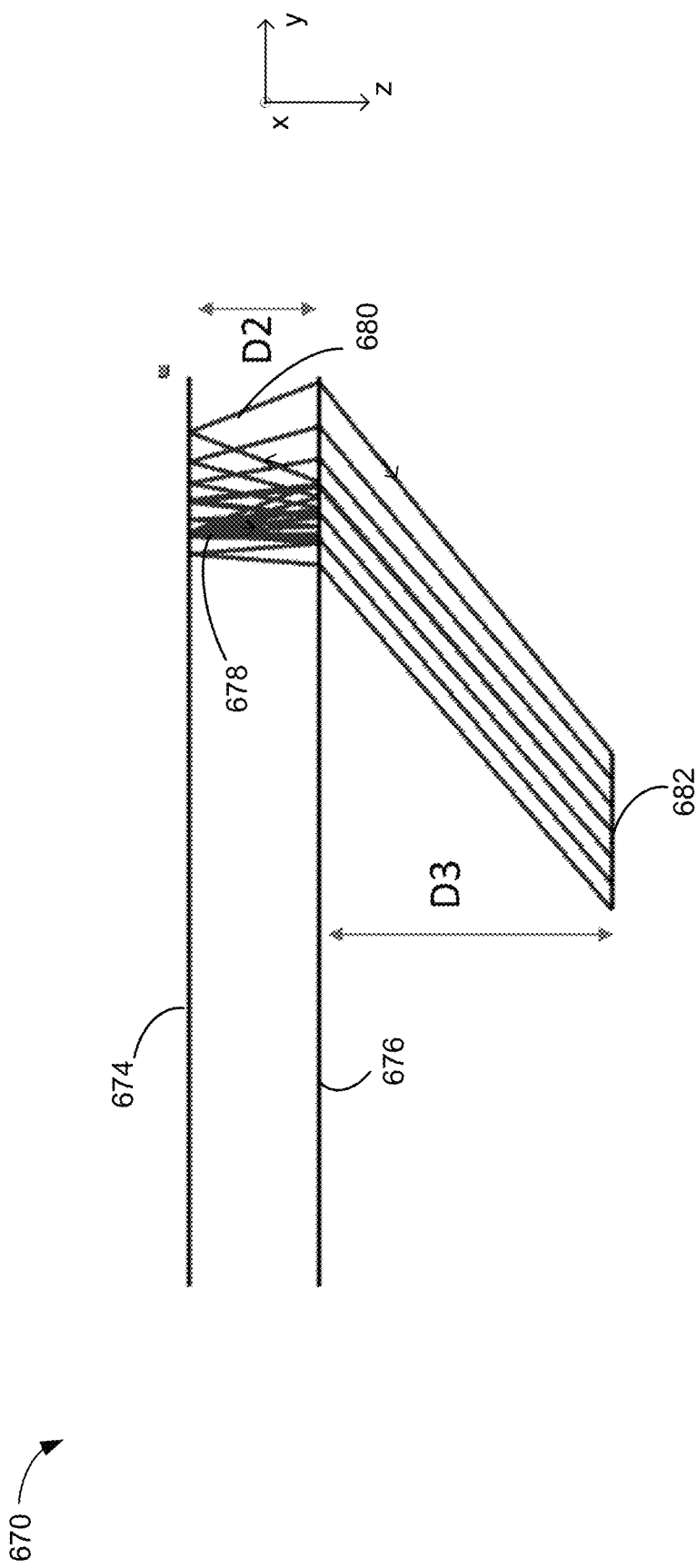
FIG. 6C is a schematic diagram illustrating a head-mounted display device in accordance with some embodiments.

FIG. 6C shows a head-mounted display device 670. A surface 674 denotes a stack of a display panel (e.g., 406 in FIG. 4A), a circular polarizer (e.g., 408 in FIG. 4A), a first partial reflector (e.g., 410 in FIG. 4A), and a phase retarder (e.g., 412 in FIG. 4A). In the head-mounted display device 670, the first partial reflector is an ordinary beamsplitter (e.g., a flat 50:50 mirror). In some embodiments, an ordinary beamsplitter is a plate beamsplitters having a thin, flat glass plate that has been coated on one surface of the glass plate. In some embodiments, plate beamsplitters have an anti-reflection coating on the second surface to remove unwanted Fresnel reflections. In some embodiments, plate beamsplitters are designed for a 45° angle of incidence. In some embodiments, the beamsplitters have an angle of incidence between 0-30°. The second partial reflector is a reflective polarizer without any optical power. Surface 676 denote a stack of both the second partial reflector and the first optical element. In some embodiments, the first optical element is a transmissive element having a quadratic or approximately quadratic phase profile. A quadratic phase profile allows the first optical element to focus light spherically. In some embodiments, a transmissive element having a longer focal length can be used because an optical path from the display panel to the transmissive element is lengthened by folding of the optical path between the first partial reflector and the second partial reflector. The transmissive element having the longer focal length allows the head-mounted display device 670 to have superior performance within the same form factor. In some embodiments, the first optical element includes a reflective element, like the second optical assembly 422 shown in FIG. 4E.

In some embodiments, the backlight in the head-mounted display device 670 is directional, but not spatially variant. In some embodiments, the backlight emits light over a cone with a full angle of approximately 30 degrees relative to the surface normal.

In the head-mounted display device 670, while the first partial reflector and the second partial reflector have no optical power, the first optical element in the head-mounted display device 670 has an optical power.

In some embodiments, D2 is approximately 20 mm, 17.5 mm, 15 mm, 12.5 mm, 10 mm, 7.5 mm, or 5 mm.

FIGS. 7A-7D are schematic diagrams illustrating Pancharatnam-berry phase (PBP) lens 700 in accordance with some embodiments. In some embodiments, PBP lens 700 is a liquid crystal optical element that includes a layer of liquid crystals. In some embodiments, PBP lens 700 includes a layer of other type of substructures, e.g., nanopillars composed of high refraction index materials. PBP lens 700 adds or removes optical power based in part on polarization of incident light. For example, if right circularly polarized (RCP) light is incident on PBP lens 700, PBP lens 700 acts as a positive lens (i.e., it causes light to converge). And, if left circularly polarized (LCP) light is incident on the PBP lens, the PBP lens acts as a negative lens (i.e., it causes light to diverge). In some embodiments, PBP lenses also change the handedness of light to the orthogonal handedness (e.g., changing LCP to RCP or vice versa). In some embodiments, PBP lenses are not wavelength selective. In some embodiments, PBP lenses are wavelength dependent. In some embodiments, the PBP lenses transmit a portion of incident light and reflects a portion of incident light. If the incident light is at the designed wavelength, LCP light is converted to RCP light, and vice versa. In contrast, if incident light has a wavelength that is outside the designed wavelength range, at least a portion of the light is transmitted without change in its polarization and without focusing or converging. PBP lenses may have a large aperture size and can be made with a very thin liquid crystal layer. Optical properties of the PBP lens (e.g., focusing power or diffracting power) are based on variation of azimuthal angles (θ) of liquid crystal molecules. For example, for a PBP lens, azimuthal angle θ of a liquid crystal molecule is determined based on Equation (1):

$$\theta = \left(\frac{r^2}{f} * \frac{\pi}{\lambda}\right) / 2 \qquad (1)$$

where r denotes a radial distance between the liquid crystal molecule and an optical center of the PBP lens, f denotes a focal distance, and λ denotes a wavelength of light that the PBP lens is designed for. In some embodiments, the azimuthal angles of the liquid crystal molecules in the x-y plane increase from the optical center to an edge of the PBP lens. In some embodiments, as expressed by Equation (1), a rate of increase in azimuthal angles between neighboring liquid crystal molecules also increases with the distance from the optical center of the PBP lens. The PBP lens creates a respective lens profile based on the orientations (i.e., azimuthal angle θ) of a liquid crystal molecule in the x-y plane. In contrast, a (non-PBP) liquid crystal lens creates a lens profile via a birefringence property (with liquid crystal molecules oriented out of x-y plane, e.g., a non-zero tilt angle from the x-y plane) and a thickness of a liquid crystal layer.

Figure 7C:
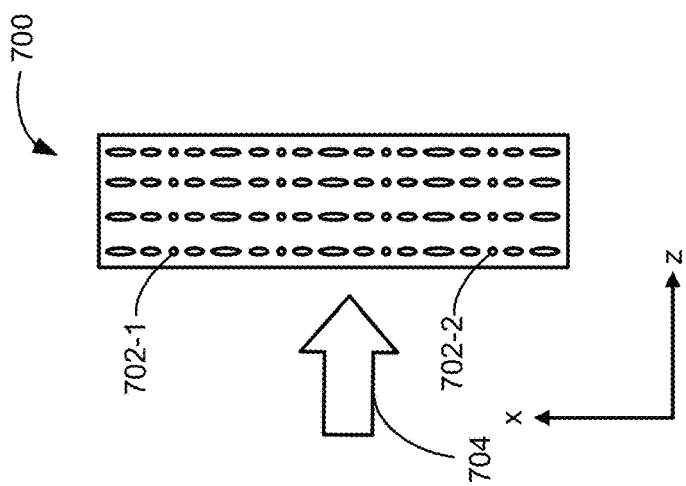
FIGS. 7A-7D are schematic diagrams illustrating a Pancharatnam-Berry phase lens in accordance with some embodiments.
Figure 7B:
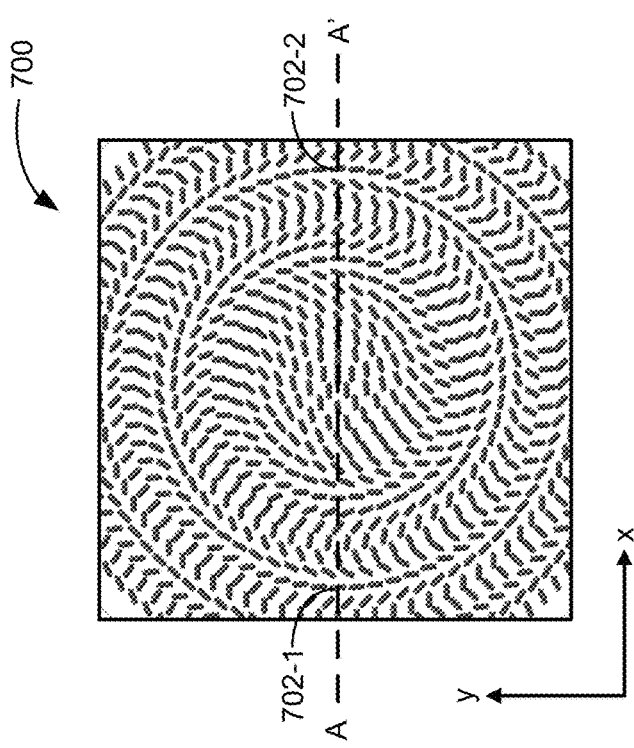
Figure 7A:
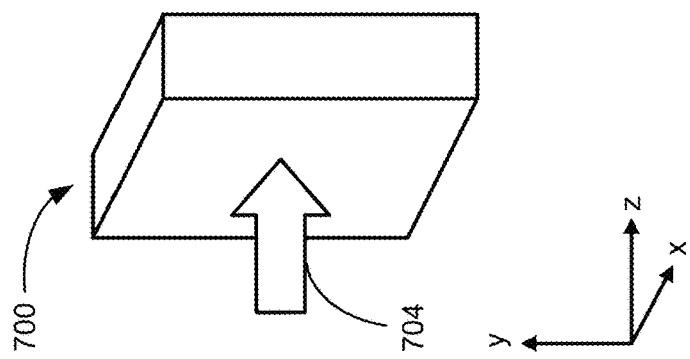

FIG. 7A illustrates a three-dimensional view of PBP lens 700 with incoming light 704 entering the lens along the z-axis.

FIG. 7B illustrates an x-y-plane view of PBP lens 700 with a plurality of liquid crystals (e.g., liquid crystals 702-1 and 702-2) with various orientations. The orientations (i.e., azimuthal angles θ) of the liquid crystals vary along reference line between A and A' from the center of PBP lens 700 toward the periphery of PBP lens 700.

FIG. 7C illustrates an x-z-cross-sectional view of PBP lens 700. As shown in FIG. 7C, the orientations of the liquid crystal (e.g., liquid crystals 702-1 and 702-2) remain constant along z-direction. FIG. 7C illustrates an example of a PBP structure that has constant variation along z and birefringent thickness (Δn×t) that is ideally half of the designed wavelength, where Δn is the birefringence of the liquid crystal material and t is the physical thickness of the plate. A PBP optical element (e.g., lens, grating) may have a liquid crystal structure that is different from the one shown in FIG. 7C. For example, a PBP optical element may include a double twist liquid crystal structure along the z-direction. In another example, a PBP optical element may include a three-layer alternate structure along the z-direction in order to provide achromatic response across a wide spectral range.

Figure 7D:

FIG. 7D illustrates a detailed plane view of the liquid crystals along the reference line between A and A' shown in FIG. 7B. Pitch 706 is defined as a distance along the x-axis at which the azimuthal angle θ of a liquid crystal has rotated 180 degrees. In some embodiments, pitch 706 varies as a function of distance from the center of PBP lens 700. In a case of a lens, the azimuthal angle θ of liquid crystals varies in accordance with Equation (1) shown above. In such cases, the pitch at the center of the lens is longest and the pitch at the edge of the lens is shortest.

FIGS. 7E-7H are schematic diagrams illustrating a polarization volume hologram (PVH) lens in accordance with some embodiments. PVH lens 710 is a liquid crystal PVH lens including a layer of liquid crystals arranged in helical structures (e.g., a liquid crystal formed of a cholesteric liquid crystal). Similar to a PBP lens (described above with respect to FIGS. 7A-7D), a PVH lens adds or removes optical power based in part on polarization of an incident light. However, PVH lens is selective with respect to circular polarization of light. When state (handedness) of the circularly polarized light is along a helical axis of a liquid crystal, the PVH lens interacts with the circularly polarized light and thereby changes the direction of the light (e.g., refracts or diffracts the light). Concurrently, while transmitting the light, the PVH lens also changes the polarization of the light. In contrast, the PVH lens transmits light with opposite circular polarization without changing its direction or polarization. For example, a PVH lens changes polarization of RCP light to LCP light and simultaneously focuses or defocuses the light while transmitting LCP light without changing its polarization or direction. Optical properties of the PVH lens (e.g., focusing power of diffracting power) are based on variation of azimuthal angles of liquid crystal molecules. In addition, the optical properties of the PVH are based on a helical axis and/or a helical pitch of a liquid crystal.

Figure 7E:
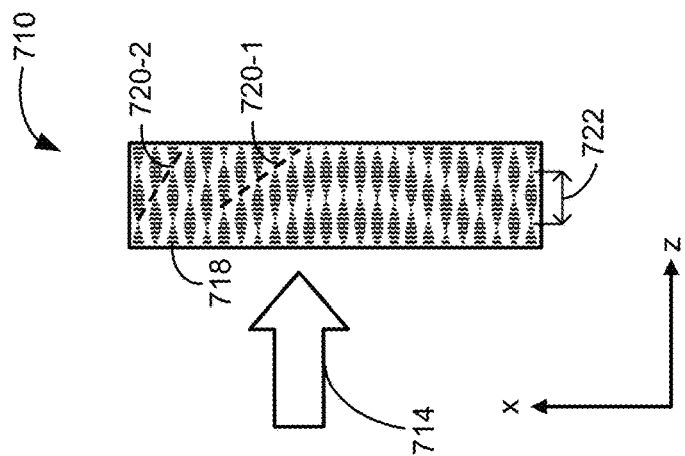
FIGS. 7E-7H are schematic diagrams illustrating a polarization volume hologram lens in accordance with some embodiments.
Figure 7F:
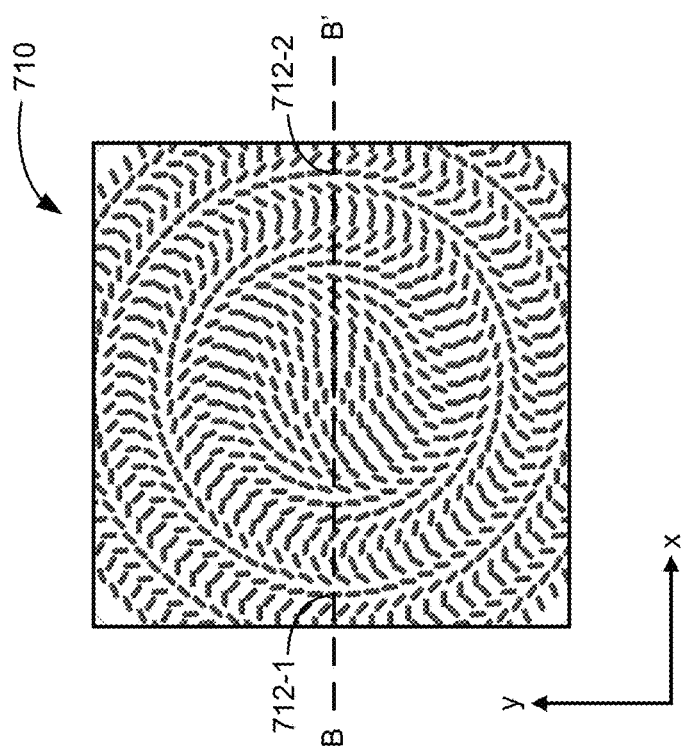
Figure 7G:
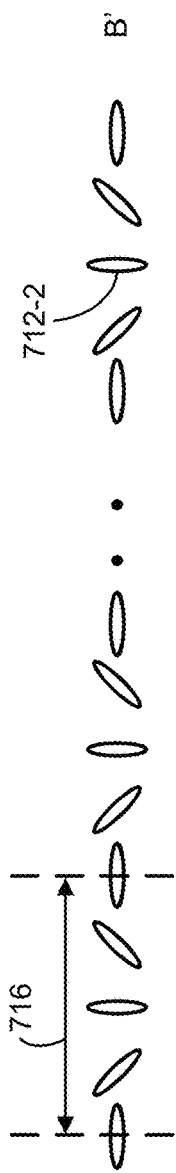

FIG. 7E illustrates a three-dimensional view of PVH lens 710 with incoming light 714 entering the lens along the z-axis. FIG. 7F illustrates an x-y plane view of PVH lens 710 with a plurality of liquid crystals (e.g., liquid crystals 712-1 and 712-2) with various orientations. The orientations (i.e., azimuthal angle θ) of the liquid crystals vary along reference line between B and B' from the center of PVH lens 710 toward the periphery of PVH lens 710. FIG. 7G illustrates an x-z-cross-sectional view of PVH lens 710. As shown in FIG. 7G, in contrast to PBP described with respect to FIG. 7C, the liquid crystals (e.g., liquid crystals 712-1 and 712-2 in FIG. 7F) of PVH lens 710 are arranged in helical structures 718. Helical structures 718 have helical axes aligned corresponding to the z-axis. As the azimuthal angle of respective liquid crystals on the x-y-plane varies, the helical structures create a volume grating with a plurality of diffraction planes (e.g., planes 720-1 and 720-2) forming cycloidal patterns. The diffraction planes (e.g., Bragg diffraction planes) defined in a volume of a PVH lens produce a periodically changing refractive index. Helical structures 718 define the polarization selectivity of PVH lens 710, as light with circular polarization handedness corresponding to the helical axis is diffracted while light with circular polarization with the opposite handedness is not diffracted. Helical structures 718 also define the wavelength selectivity of PVH lens 710, as helical pitch 722 determines which wavelength(s) are diffracted by PVH lens 710 (light with other wavelengths is not diffracted). For example, for a PVH lens, the designed wavelength for which the PVH lens will diffract the light is determined based on Equation (2):

$$\lambda = 2n_{eff}P_z \quad (2)$$

where λ denotes a wavelength of light that the PVH lens is designed for, $P_z$ is distance of helical pitch 722, and $n_{eff}$ is the effective refractive index of the liquid crystal medium that is a birefringent medium. A helical pitch refers to a distance when a helix has made a 180 degree turn along a helical axis (e.g., the z-axis in FIG. 7G). The effective refractive index of the birefringent liquid crystal medium is determined based on Equation (3):

$$n_{eff} = \sqrt{\frac{n_0^2 + 2n_e^2}{3}} \quad (3)$$

where $n_0$ is the ordinary refractive index of the birefringent medium and $n_e$ is the extraordinary refractive index of the birefringent medium.

Figure 7H:
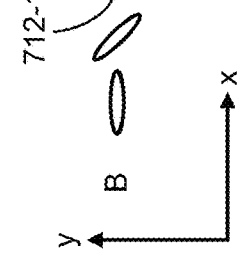

FIG. 7H illustrates a detailed plane view of the liquid crystals along the reference line between B and B' in FIG. 7F. Pitch 716 is defined as a distance along x-axis at which the azimuth angle of liquid crystal has rotated 180 degrees from the initial orientation. In some embodiments, pitch 716 varies as a function of distance from the center of PVH lens 710. In a case of a lens, the azimuthal angle of liquid crystals varies in accordance with Equation (1) shown above. In such cases, the pitch at the center of the lens is the longest and the pitch at the edge of the lens is the shortest.

Figure 7I:
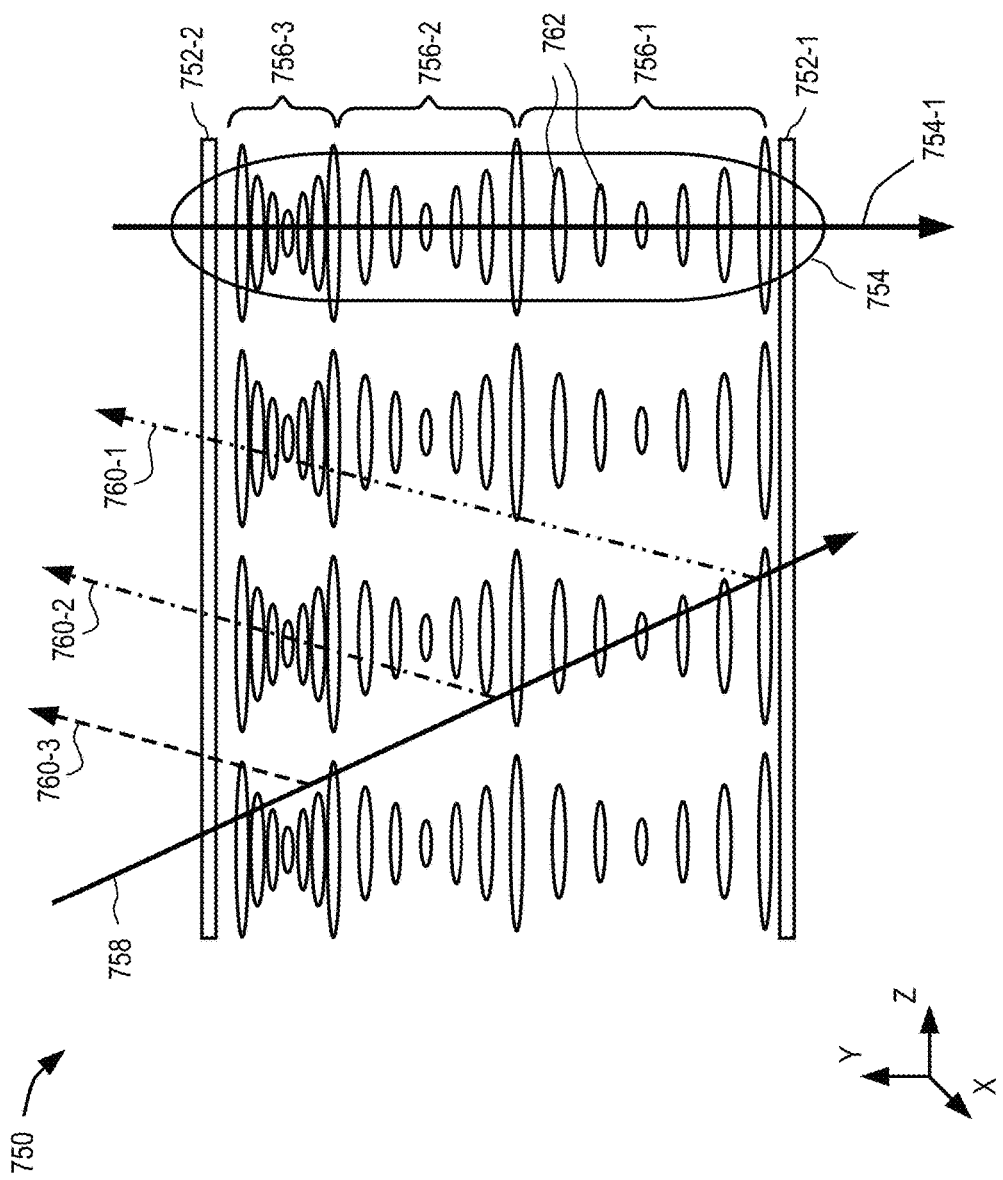
FIG. 7I is a schematic diagram illustrating a gradient pitch polarization volume hologram grating in accordance with some embodiments.

FIG. 7I is a schematic diagram illustrating a gradient pitch polarization volume hologram grating in accordance with some embodiments. In FIG. 7I, liquid crystal layer 750 includes liquid crystals 762 arranged in helical configurations 754 (e.g., cholesteric liquid crystals). FIG. 7I also shows that liquid crystals 762 are disposed between substrates 752-1 and 752-1. At least one of substrates 752-1 and 752-2 is made of an optically transparent substrate (e.g., glass or plastic). Helical configurations 754 have a helical axis perpendicular to a surface of liquid crystal layer 750 (e.g., surfaces defined by substrates 752-1 and 752-2).

A helical configuration has a pitch (e.g., periodicity) defined as a distance along its helical axis (e.g., axis 754-1) at which an azimuth angle of a helical liquid crystal has rotated 180 degrees. In FIG. 7I, helical configurations 754 have a plurality of portions with different pitches including pitches 756-1, 756-2, and 756-3, where pitch 756-1 is greater than pitch 756-2 and pitch 756-2 is greater than pitch 756-3 (e.g., helical configurations 754 have a first portion with the first pitch 756-1, a second portion with the second pitch 756-2, and a third portion with the third pitch 756-3). In some embodiments, the pitch varies gradually. In some embodiments, the pitch remains constant between substrates 752-1 and 752-2. In some embodiments, different pitches of the helical configurations are achieved by controlling a concentration and/or a type of a chiral dopant used for forming the helical configurations. In some embodiments, a pitch of the helical configuration determines the wavelength selectivity of a liquid crystal layer. In some embodiments, a liquid crystal layer having a varying pitch (the liquid crystal layer has a range of pitches) is used to reflect diffract light of a broad wavelength range (e.g., a broadband reflective polarizer) so that the first region of liquid crystal layer 750 corresponding to pitch 756-1 reflects diffracts a first wavelength range, the second region of liquid crystal layer 750 corresponding to pitch 756-2 reflects diffracts a second wavelength range, and the third region of liquid crystal layer 750 corresponding to pitch 756-3 reflects diffracts a third wavelength range. In some embodiments, the first wavelength range corresponds to red color (e.g., 635-700 nm), the second wavelength range corresponds to green color (e.g., 495-570 nm), and the third wavelength range corresponds to blue color (e.g., 450-490 nm) such that liquid crystal layer 400 reflects a broad wavelength range (e.g., a wavelength range from 450 nm to 700 nm). In some embodiments, a broad wavelength range corresponds to a bandwidth (e.g., a full-width at half-maximum) of 250 nm or more (e.g., 300 nm, 350 nm, 400 nm, etc.). Alternative, a liquid crystal layer having a constant pitch is configured to reflect diffract light at a narrow wavelength range (e.g., a narrowband reflective polarizer). In some embodiments, a narrow wavelength range corresponds to a bandwidth (e.g., a full-width at half-maximum) of 100 nm or less (e.g., 50 nm, 30 nm, 20 nm, 10 nm, 5 nm, or 1 nm or less). For example, liquid crystal layer 750 having a constant pitch selective for green color is configured to redirect light between 495 nm and 570 nm.

In some embodiments, the helical configuration defines a plurality of diffraction planes extending across liquid crystal layer 750. The diffraction planes diffract respective portions of incident light 758 received by liquid crystal layer 750. For example, a first region of liquid crystal layer 750 corresponding to pitch 756-1 diffracts a first portion of light 758 (e.g., light 760-1 corresponding to the first wavelength range), a second region of liquid crystal layer 750 corresponding to pitch 756-2 diffracts a second portion of light 758 (e.g., light 760-2 corresponding to the second wavelength range), and a third region of liquid crystal layer 750 corresponding to pitch 406-3 diffracts a third portion of light 758 (e.g., light 760-3 corresponding to the third wavelength range). In FIG. 7I, the first portion of light 758, the second portion of light 758, and the third portion of the light 758 are diffracted into a same direction. In some other embodiments, the first portion of light 758, the second portion of light 758, and the third portion of the light 758 are diffracted into distinct directions.

A cholesteric liquid crystal (CLC) layer, such as liquid crystal layer 750 in FIG. 7I, operates as a reflective polarizer and is selective with respect to handedness of light incident thereon. For example, for a CLC layer configured to diffract a circularly polarized light with a predefined handedness (and within a predefined incident angle range and within a predefined wavelength range), when a circularly polarized light having the predefined handedness (and an incident angle within the predefined incident angle and a wavelength within the predefined wavelength range) impinges on the CLC layer, the CLC layer diffracts the circularly polarized light (without diffracting an orthogonally polarized light). While reflectively diffracting the direction of the light, the CLC layer also changes the polarization of the reflectively diffracted light (e.g., a left-handed light is reflectively diffracted into a right-handed light). In comparison, the CLC layer forgoes diffracting light that does not have the predefined handedness (and does not have an incident angle within the predefined incident angle or does not have a wavelength within the predefined wavelength range). For example, a CLC layer configured to reflectively diffract a right-handed circularly polarized (RCP) light changes polarization of a RCP light to a left-handed circularly polarized (LCP) light and simultaneously redirects the light while transmitting LCP light without changing its polarization or direction (e.g., a CLC layer may reflectively diffract light having a first circular polarization and a first wavelength range and transmit light having a polarization distinct from the first circular polarization and/or light having a wavelength distinct from the first wavelength range). The CLC may be wavelength-dependent. Thus, if an incident light with the predefined handedness (e.g., RCP) and an incident angle within the predefined incident angle range has a wavelength corresponding to a predefined wavelength range, the CLC layer reflectively diffracts the RCP light and converts the polarization of the diffracted light to LCP. In comparison, an incident light (with or without the predefined handedness (e.g., RCP) and with an incident angle within the predefined incident angle range) having a wavelength outside the predefined wavelength range is transmitted through the CLC layer without redirection while maintaining its polarization. The CLC may be specific to the incident angle. Thus, if an incident light with the predefined handedness (e.g., RCP) and a wavelength within the predefined wavelength range has an incident angle within the designed incident angle range, the CLC layer redirects the RCP light and converts the polarization of the redirected light to LCP. In comparison, an incident light (with or without the predefined handedness (e.g., RCP) and a wavelength within the predefined wavelength range) having an incident angle outside the designed incident angle range is transmitted through the CLC layer without redirection while maintaining its polarization.

Although FIGS. 7A-7D illustrate a PBP lens and FIGS. 7E-7H illustrate a PVH lens, a person having ordinary skill in the art would understand that a PBP grating may be used in place of a PBP lens in some configurations and a PVH grating may be used in place of a PVH lens in some configurations. Similarly, although FIG. 7I illustrates a gradient pitch PVH grating, a person having ordinary skill in the art would understand that a gradient pitch PVH lens may be used in place of a gradient pitch PVH grating in some embodiments.

In light of these principles and examples, now we turn to certain embodiments.

In accordance with some embodiments, a head-mounted display device includes an optical device that includes a first partial reflector and a second partial reflector positioned relative to the first partial reflector so that the second partial reflector receives first light transmitted through the first partial reflector and reflects at least a portion of the first light toward the first partial reflector as second light. At least a portion of the second light is reflected by the first partial reflector as third light, and at least a portion of the third light is transmitted through the second partial reflector. At least one of the first partial reflector or the second partial reflector comprises a reflective holographic element (e.g., FIGS. 4A-6C).

In some embodiments, the reflective holographic element has a freeform phase profile.

In some embodiments, the reflective holographic element is a wavelength sensitive element having different phase profiles for each of red, green, and blue wavelengths.

In some embodiments, the independent phase profiles are encoded in the reflective holographic by wavelength multiplexing.

In some embodiments, the reflective holographic element includes a stack of two or more holograms, each of which is sensitive to a distinct wavelength range.

In some embodiments, the reflective holographic element includes a pitch-gradient polarization volume hologram. In some embodiments, the pitch-gradient polarization volume hologram includes cholesteric liquid crystals.

In some embodiments, the optical device includes a first optical element having optical power.

In some embodiments, the first partial reflector includes a beam-splitter and the second partial reflector includes a reflective polarizer.

In some embodiments, the optical device further includes a third partial reflector.

In some embodiments, the third partial reflector is a reflective holographic element.

In some embodiments, the optical device includes a first optical element that is a transmissive diffractive element.

In some embodiments, the reflective holographic element is selected from the group consisting of volume Bragg grating, polarization volume hologram and Pancharatnam Berry Phase element.

In some embodiments, the first partial reflector includes a volume Bragg grating and the second optical element includes a polarization volume hologram.

In some embodiments, the polarization volume hologram has optical power.

In some embodiments, the first partial reflector includes a volume Bragg grating and the second partial reflector includes a volume Bragg grating.

In some embodiments, the first partial reflector includes a volume Bragg grating and the second partial reflector includes a polarization-independent partial reflector.

In some embodiments, the first partial reflector includes a polarization-independent partial reflector and the second partial reflector includes a volume Bragg grating.

In some embodiments, the first partial reflector includes a polarization volume hologram and the second partial reflector includes a reflective polarizer.

In some embodiments, the first partial reflector has optical power and the second partial reflector is positioned away from a focal plane of the first partial reflector.

In some embodiments, the second partial reflector has no optical power.

In some embodiments, the second partial reflector is spaced apart by an air gap from the first partial reflector, and a size of the air gap is configured to be varied.

In some embodiments, a distance between a display panel and the first partial reflector is configured to be varied.

In some embodiments, the first partial reflector receives light emitted from a limited emission cone of a display panel, and the emission cone substantially correspond to light that enters an eyebox of a user of the optical system.

In accordance with some embodiments, an optical device for a head-mounted display device includes a first partial reflector and a second partial reflector positioned relative to the first partial reflector so that the second partial reflector receives first light transmitted through the first partial reflector and reflects at least a portion of the first light toward the first partial reflector as second light. At least a portion of the second light is reflected by the first partial reflector as third light, and at least a portion of the third light is transmitted through the second partial reflector. The first partial reflector and the second partial reflector have no optical power.

In some embodiments, the optical device further includes a first optical element that includes a holographic element.

In some embodiments, the first partial reflector includes a beam-splitter and the second partial reflector includes a reflective polarizer.

In some embodiments, the optical device further includes a first optical element that is a transmissive diffractive element.

In some embodiments, the transmissive diffractive element is adjacent the second partial reflector. In some embodiments, the transmissive diffractive element includes a volume Bragg grating, a polarization volume hologram, and a PBP element.

In accordance with some embodiments, an optical system includes an optical device having a first partial reflector; and a second partial reflector positioned relative to the first partial reflector so that the second partial reflector receives first light transmitted through the first partial reflector and reflects at least a portion of the first light toward the first partial reflector as second light. At least a portion of the second light is reflected by the first partial reflector as third light, and at least a portion of the third light is transmitted through the second partial reflector. At least one of the first partial reflector or the second partial reflector includes a reflective holographic element. The optical system includes a display device.

In some embodiments, the display device is coupled with a substantially coherent light source.

In some embodiments, the substantially coherent light source includes a laser.

In some embodiments, the optical system includes a de-speckler.

In some embodiments, the de-speckler is positioned to de-speckle light emitted from the substantially coherent light source.

In some embodiments, the de-speckler is positioned to de-speckle light emitted from the display device.

In some embodiments, the de-speckler includes an electroactive polymer configured to provide a time-varying diffusion pattern.

In some embodiments, the first partial reflector receives light emitted from a display panel of the display device, the emitted light having a limited emission cone.

In some embodiments, the emission cone varies spatially over the display panel.

In some embodiments, the display panel is configured to provide, at a first location on the display panel, light having a first emission cone characterized by a first emission cone angle and provide, at a second location on the display panel that is distinct from the first location, light having a second emission cone characterized by a second emission cone angle that is distinct from the first emission cone angle.

In some embodiments, central rays of emission cones from the display panel intersect a common point in front of or behind the display panel.

In some embodiments, emission cones substantially correspond to light that enters an eyebox of a user of the optical system.

In some embodiments, the display device includes a directional backlight.

In some embodiments, the directional backlight includes a volume hologram.

In some embodiments, the directional backlight includes a non-directional light source and an angle limiting plate.

In some embodiments, the directional backlight includes a diffuser.

In some embodiments, the display device is positioned in proximity to the first partial reflector.

In some embodiments, the optical system is configured to change a size of the air gap between the optical device and the display device.

In some embodiments, the display device includes a liquid crystal display (LCD) panel or a liquid crystal on silicon (LCOS) panel.

In accordance with some embodiments, an optical device for a head-mounted display device includes a first partial reflector and a second partial reflector positioned relative to the first partial reflector so that the second partial reflector receives first light transmitted through the first partial reflector and reflects at least a portion of the first light toward the first partial reflector as second light. At least a portion of the second light is reflected by the first partial reflector as third light, and at least a portion of the third light is transmitted through the second partial reflector. At least one of the first partial reflector or the second partial reflector comprises a metasurface or a multi-order diffractive element.

In accordance with some embodiments, an optical system includes a display device and any optical device described herein.

In some embodiments, the reflective holographic element is recorded interferometrically. In some embodiments, the reflective holographic element is recorded with a programmatically controlled phase profile.

In some embodiments, the display device uses substantially coherent illumination. In some embodiments, the display device uses laser illumination. In some embodiments, the light from the illumination source or display panel is despeckled. In some embodiments, the optical system further includes a despeckler unit having an electroactive polymer configured to provide a time-varying diffusing pattern.

In some embodiments, light emitted from the display panel has a substantially limited emission cone. In some embodiments, the emission cone varies spatially over the display panel. In some embodiments, the emission cones substantially correspond to light that enters a viewing eyebox of a user of the optical system. In some embodiments, central rays of the spatially varying emission cones substantially intersect at a point in front of or behind the display panel. In some embodiments, the system further includes a directional backlight having a volume hologram. In some embodiments, the directional backlight includes a non-directional backlight and an angle limiting plate. In some embodiments, the directional backlight includes an engineered diffuser.

In some embodiments, the display device is an LCD panel or a LCOS panel. In some embodiments, the display panel is placed in close proximity (e.g., substantially in mechanical contact) to the first partial reflector.

In some embodiments, the holographic element includes a stack of two or more holograms, each of which is sensitive to one or more wavelengths.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. For example, although the optical device including the first partial reflector and the second partial reflector is described for use in a head-mounted display device, the optical device including the first partial reflector and the second partial reflector may be used independently (and separately) from the head-mounted display device. The embodiments were chosen in order to best explain the principles underlying the claims and their practical applications, to thereby enable others skilled in the art to best use the embodiments with various modifications as are suited to the particular uses contemplated.

What is claimed is:

1. An optical device for a head-mounted display device, the optical device comprising:
   a first partial reflector;
   a second partial reflector positioned relative to the first partial reflector so that the second partial reflector receives first light transmitted through the first partial reflector and reflects at least a portion of the first light toward the first partial reflector as second light, wherein:
      at least a portion of the second light is reflected by the first partial reflector as third light, and at least a portion of the third light is transmitted through the second partial reflector, and
      at least one of the first partial reflector or the second partial reflector comprises a reflective holographic element, and
   a third partial reflector.

2. The optical device of claim 1, wherein the reflective holographic element has a freeform phase profile.

3. The optical device of claim 1, wherein the reflective holographic element is a wavelength sensitive element having different phase profiles for each of red, green, and blue wavelengths.

4. The optical device of claim 3, wherein the phase profiles are encoded in the reflective holographic element by wavelength multiplexing.

5. The optical device of claim 3, wherein the reflective holographic element includes a stack of two or more holograms, each of which is sensitive to a distinct wavelength range.

6. The optical device of claim 1, wherein the reflective holographic element includes a pitch-gradient polarization volume hologram.

7. The optical device of claim 6, wherein the pitch-gradient polarization volume hologram includes cholesteric liquid crystals.

8. The optical device of claim 1, wherein the third partial reflector is a reflective holographic element.

9. The optical device of claim 1, wherein the first partial reflector comprises a volume Bragg grating and the second partial reflector comprises a reflective polarizer.

10. The optical device of claim 1, wherein the reflective holographic element is selected from the group consisting of volume Bragg grating, polarization volume hologram and Pancharatnam Berry Phase element.

11. The optical device of claim 1, wherein the second partial reflector is spaced apart by an air gap from the first partial reflector, and a size of the air gap is configured to be varied.

12. An optical device for a head-mounted display device, the optical device comprising:
a first partial reflector; and
a second partial reflector positioned relative to the first partial reflector so that the second partial reflector receives first light transmitted through the first partial reflector and reflects at least a portion of the first light toward the first partial reflector as second light, wherein:
at least a portion of the second light is reflected by the first partial reflector as third light, and at least a portion of the third light is transmitted through the second partial reflector,
at least one of the first partial reflector or the second partial reflector comprises a reflective holographic element, and
the first partial reflector comprises a volume Bragg grating and the second partial reflector comprises a polarization volume hologram.

13. The optical device of claim 12, wherein the reflective holographic element has a freeform phase profile.

14. The optical device of claim 12, wherein the reflective holographic element is a wavelength sensitive element having different phase profiles for each of red, green, and blue wavelengths.

15. An optical device for a head-mounted display device, the optical device comprising:
a first partial reflector; and
a second partial reflector positioned relative to the first partial reflector so that the second partial reflector receives first light transmitted through the first partial reflector and reflects at least a portion of the first light toward the first partial reflector as second light, wherein:
at least a portion of the second light is reflected by the first partial reflector as third light, and at least a portion of the third light is transmitted through the second partial reflector,
at least one of the first partial reflector or the second partial reflector comprises a reflective holographic element, and
the first partial reflector comprises a polarization volume hologram and the second partial reflector comprises a reflective polarizer.

16. The optical device of claim 15, wherein the reflective holographic element has a freeform phase profile.

17. The optical device of claim 15, wherein the reflective holographic element is a wavelength sensitive element having different phase profiles for each of red, green, and blue wavelengths.

18. An optical device for a head-mounted display device, the optical device comprising:
a first partial reflector; and
a second partial reflector positioned relative to the first partial reflector so that the second partial reflector receives first light transmitted through the first partial reflector and reflects at least a portion of the first light toward the first partial reflector as second light, wherein:
at least a portion of the second light is reflected by the first partial reflector as third light, and at least a portion of the third light is transmitted through the second partial reflector,
at least one of the first partial reflector or the second partial reflector comprises a reflective holographic element, and
the first partial reflector has optical power and the second partial reflector is positioned away from a focal plane of the first partial reflector.

19. The optical device of claim 18, wherein the second partial reflector has no optical power.

20. The optical device of claim 18, wherein the reflective holographic element has a freeform phase profile.

* * * * *